US009470900B2

(12) United States Patent
Nakahata et al.

(10) Patent No.: US 9,470,900 B2
(45) Date of Patent: Oct. 18, 2016

(54) DISPLAY UNIT, DISPLAY DRIVING CIRCUIT, AND DISPLAY DRIVING METHOD

(71) Applicant: SONY CORPORATION, Tokyo (JP)

(72) Inventors: Yuji Nakahata, Tokyo (JP); Koichi Katagawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 13/943,022

(22) Filed: Jul. 16, 2013

(65) Prior Publication Data

US 2014/0028741 A1    Jan. 30, 2014

(30) Foreign Application Priority Data

Jul. 25, 2012  (JP) ................................. 2012-164333

(51) Int. Cl.
| | |
|---|---|
| G02B 27/22 | (2006.01) |
| G09G 5/10 | (2006.01) |
| G09G 3/36 | (2006.01) |
| G09G 3/00 | (2006.01) |
| H04N 13/04 | (2006.01) |
| G09G 3/34 | (2006.01) |

(52) U.S. Cl.
CPC ........... *G02B 27/2264* (2013.01); *G09G 3/003* (2013.01); *G09G 3/3607* (2013.01); *G09G 3/3648* (2013.01); *G09G 3/3655* (2013.01); *G09G 5/10* (2013.01); *H04N 13/0438* (2013.01); *G09G 3/3406* (2013.01); *G09G 2300/0439* (2013.01); *G09G 2300/0495* (2013.01); *G09G 2320/0209* (2013.01)

(58) Field of Classification Search
None
See application file for complete search history.

(56) References Cited

U.S. PATENT DOCUMENTS

2012/0033055 A1* 2/2012 Yamauchi et al. .............. 348/51

FOREIGN PATENT DOCUMENTS

CN         102282860 A      12/2011

OTHER PUBLICATIONS

Dae-Sik Kim et al., New 240Hz Driving Method for Full HD & High Quality 3D LCD TV, SID Symposium Digest of Technical Papers vol. 41 Issue 1, May 2010, pp. 762-765.
Sang Soo Kim et al., World's First 240Hz TFT-LCD Technology for Full-HD LCD-TV and Its Application to 3D Display, SID Symposium Digest of Technical Papers vol. 40, Issue 1, Jun. 2009, pp. 424-427.
Combined Chinese Office Action and Search Report issued Aug. 8, 2016 in Patent Application No. 201310301320.6 (with English language translation).

* cited by examiner

*Primary Examiner* — Kenneth B Lee, Jr.
(74) *Attorney, Agent, or Firm* — Oblon, McClelland, Maier & Neustadt, L.L.P.

(57) ABSTRACT

A display unit includes: a display section having a plurality of pixels in a first group and a plurality of pixels in a second group, and performing a display operation by switching a display based on a first type of frame image during a first period and a display based on a second type of frame image during a second period; and a driving section performing a first driving to drive the plurality of pixels in the first group without driving the plurality of pixels in the second group during the first period, and performing a second driving to drive the plurality of pixels in the second group without driving the plurality of pixels in the first group during the second period.

20 Claims, 29 Drawing Sheets

|  | P1 | P2 | P3 | P4 | P5 | P6 | P7 | P8 |
|---|---|---|---|---|---|---|---|---|
| ODD-NUMBERED LINE | FL | FL | Bk | Bk | — | — | — | — |
| EVEN-NUMBERED LINE | — | — | — | — | FR | FR | Bk | Bk |
FIG. 8
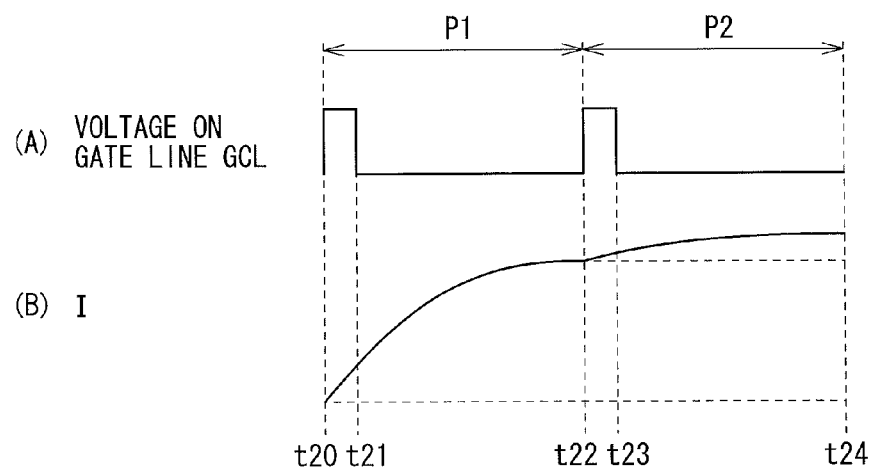
FIG. 9
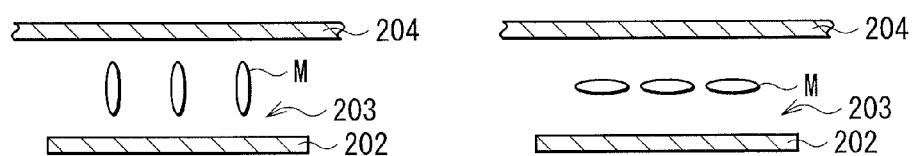
FIG. 10A        FIG. 10B

| | P1R | P2R | P3R | P4R |
|---|---|---|---|---|
| ODD-NUMBERED LINE | FL | FL | Bk | Bk |
| EVEN-NUMBERED LINE | Bk | Bk | FR | FR |
FIG. 16
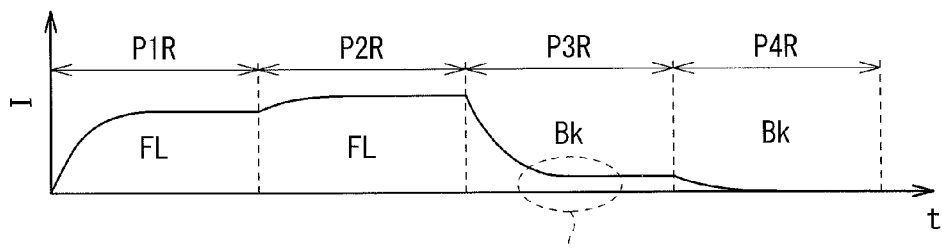
FIG. 17A
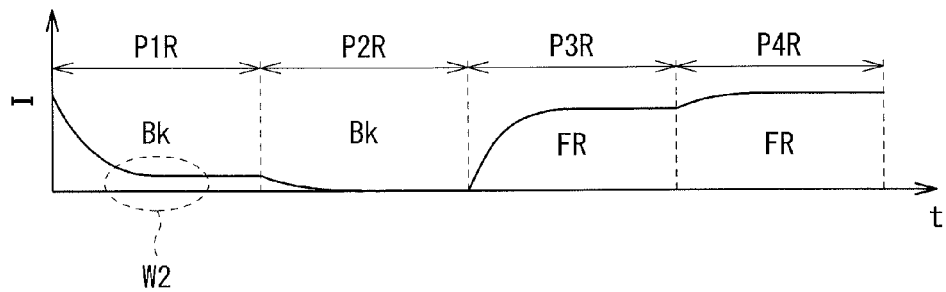
FIG. 17B
| | P1 | P2 | P3 | P4 | P5 | P6 | P7 | P8 |
|---|---|---|---|---|---|---|---|---|
| ODD-NUMBERED LINE | FL | FL | Bk | Bk | — | — | Bk | Bk |
| EVEN-NUMBERED LINE | — | — | Bk | Bk | FR | FR | Bk | Bk |
FIG. 18

|  | P1 | P2 | P3 | P4 | P5 | P6 | P7 | P8 |
|---|---|---|---|---|---|---|---|---|
| ODD-NUMBERED LINE | FL | FL | FL | Bk | — | — | — | — |
| EVEN-NUMBERED LINE | — | — | — | — | FR | FR | FR | Bk |

FIG. 20

|  | P1 | P2 | P3 | P4 | P5 | P6 | P7 | P8 |
|---|---|---|---|---|---|---|---|---|
| ODD-NUMBERED LINE | FL | Bk | Bk | Bk | — | — | — | — |
| EVEN-NUMBERED LINE | — | — | — | — | FR | Bk | Bk | Bk |

FIG. 22

|  | P1 | P2 | P3 | P4 | P5 | P6 | P7 | P8 |
|---|---|---|---|---|---|---|---|---|
| ODD-NUMBERED LINE | FL | FL | Bk | — | — | — | — | — |
| EVEN-NUMBERED LINE | — | — | — | — | FR | FR | Bk | — |

F I G. 24

|  | P1 | P2 | P3 | P4 | P5 | P6 | P7 | P8 |
|---|---|---|---|---|---|---|---|---|
| ODD-NUMBERED LINE | FL | — | Bk | — | — | — | — | — |
| EVEN-NUMBERED LINE | — | — | — | — | FR | — | Bk | — |

FIG. 26

|  | P1 | P2 | P3 | P4 | P5 | P6 | P7 | P8 |
|---|---|---|---|---|---|---|---|---|
| ODD-NUMBERED LINE | FL | — | — | Bk | — | — | — | — |
| EVEN-NUMBERED LINE | — | — | — | — | FR | — | — | Bk |

FIG. 28

|  | P1 | P2 | P3 | P4 | P5 | P6 | P7 | P8 |
|---|---|---|---|---|---|---|---|---|
| ODD-NUMBERED LINE | FL | Bk | — | — | — | — | — | — |
| EVEN-NUMBERED LINE | — | — | — | — | FR | Bk | — | — |

| | P1 | P2 | P3 | P4 | P5 | P6 | P7 | P8 |
|---|---|---|---|---|---|---|---|---|
| ODD-NUMBERED LINE | FA | FA | Bk | Bk | — | — | — | — |
| EVEN-NUMBERED LINE | — | — | — | — | FB | FB | Bk | Bk |

DISPLAY UNIT, DISPLAY DRIVING CIRCUIT, AND DISPLAY DRIVING METHOD

BACKGROUND

The present disclosure relates to a display unit for displaying images, as well as a display driving circuit and a display driving method that are in use for such a display unit.

In recent years, display systems capable of achieving a stereoscopic display have been attracting attention. One of such display systems is a display system using shutter glasses. In this display system, left-eye images and right-eye images with parallax components with respect to each other are alternately displayed on a display unit in a time-divisional manner, and at the same time, an opening/closing motion of a left-eye shutter and a right-eye shutter of shutter glasses is controlled to be switched in synchronization with switching of those images. Such a switching operation is performed repeatedly, which allows viewers to perceive an image composed of those series of images as a stereoscopic image with an appearance of depth.

In such a display system, a variety of attempts on improvement of the image quality have been made. For example, in the nonpatent document 1: D. S. Kim et al., "New 240 Hz Driving Method for Full HD & High Quality 3D LCD TV", SID 10 DIGEST, pp. 762-765, and the nonpatent document 2: S. S. Kim et al., "World's First 240 Hz TFT-LCD Technology for Full-HD LCD-TV and Its Application to 3D Display", SID 09 DIGEST, pp. 424-427, a so-called black image insertion driving is disclosed that displays a black image between a left-eye image and a right-eye image.

SUMMARY

Meanwhile, in general, high image quality is desired in display units, and it is also expected to realize high image quality in display units capable of achieving a stereoscopic display.

It is desirable to provide a display unit, a display driving circuit, and a display driving method that allow the image quality to be enhanced.

According to an embodiment of the present disclosure, there is provided a display unit including: a display section having a plurality of pixels in a first group and a plurality of pixels in a second group, and performing a display operation by switching a display based on a first type of frame image during a first period and a display based on a second type of frame image during a second period; and a driving section performing a first driving to drive the plurality of pixels in the first group without driving the plurality of pixels in the second group during the first period, and performing a second driving to drive the plurality of pixels in the second group without driving the plurality of pixels in the first group during the second period.

According to an embodiment of the present disclosure, there is provided a display driving circuit including: a driving section performing a first driving to drive a plurality of pixels in a first group without driving a plurality of pixels in a second group during a first period, and performing a second driving to drive the plurality of pixels in the second group without driving the plurality of pixels in the first group during a second period for a display section having the plurality of pixels in the first group and the plurality of pixels in the second group, the display section performing a display operation by switching a display based on a first type of frame image during the first period and a display based on a second type of frame image during the second period.

According to an embodiment of the present disclosure, there is provided a display driving method including: preparing a first type of frame image and a second type of frame image; and performing a display operation by switching a display based on the first type of frame image during a first period and a display based on the second type of frame image during a second period by performing a first driving to drive a plurality of pixels in a first group without driving a plurality of pixels in a second group during the first period and by performing a second driving to drive the plurality of pixels in the second group without driving the plurality of pixels in the first group during the second period.

In the display unit, the display driving circuit, and the display driving method according to the above-described respective embodiments of the present disclosure, a display operation is carried out by switching a display based on a first type of frame image during a first period and a display based on a second type of frame image during a second period. On this occasion, a plurality of pixels in a first group are driven without driving a plurality of pixels in a second group during the first period, and the plurality of pixels in the second group are driven without driving the plurality of pixels in the first group during the second period.

In the display unit, the display driving circuit, and the display driving method according to the above-described respective embodiments of the present disclosure, a plurality of pixels in a first group are driven without driving a plurality of pixels in a second group during a first period, and the plurality of pixels in the second group are driven without driving the plurality of pixels in the first group during a second period, which allows the image quality to be enhanced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

Figure 1:
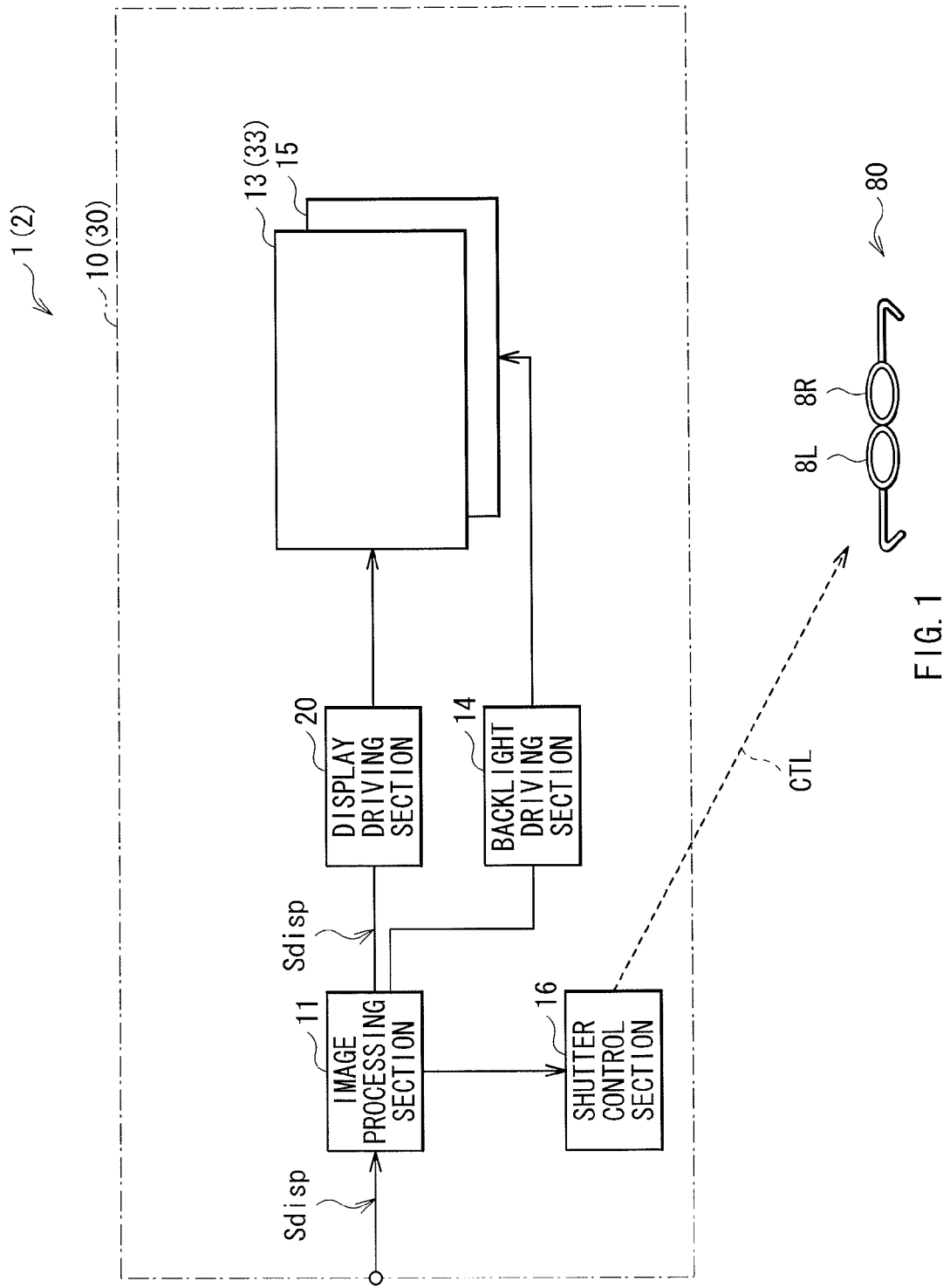
FIG. 1 is a block diagram showing a configuration example of a display system according to an embodiment of the present disclosure.
Figure 7:
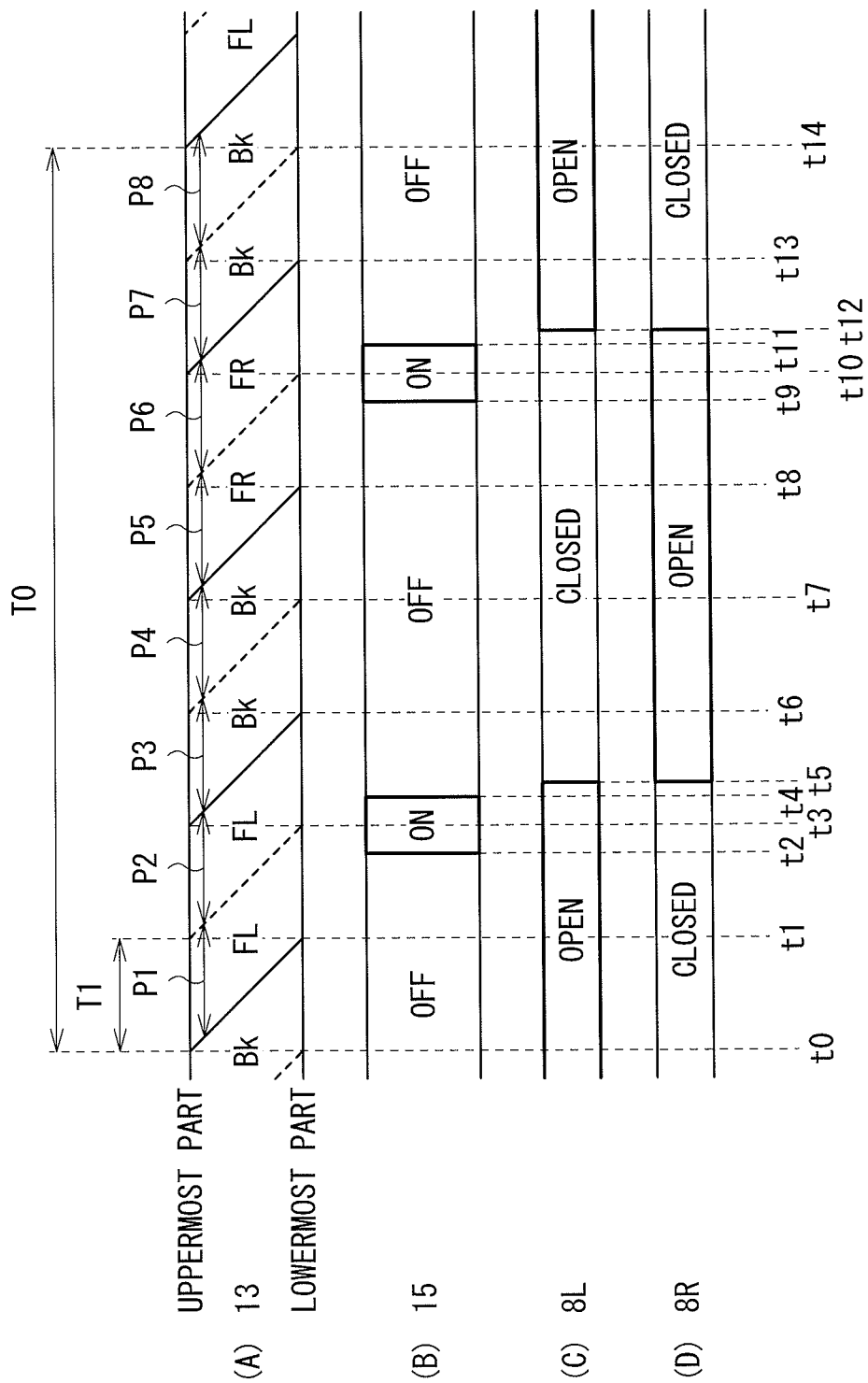

(A), (B), (C), and (D) of FIG. 7 are each a timing waveform chart showing an operation example of the display system illustrated in FIG. 1.

FIG. 8 is a table showing an operation example of the display system illustrated in FIG. 1.

Figure 4:
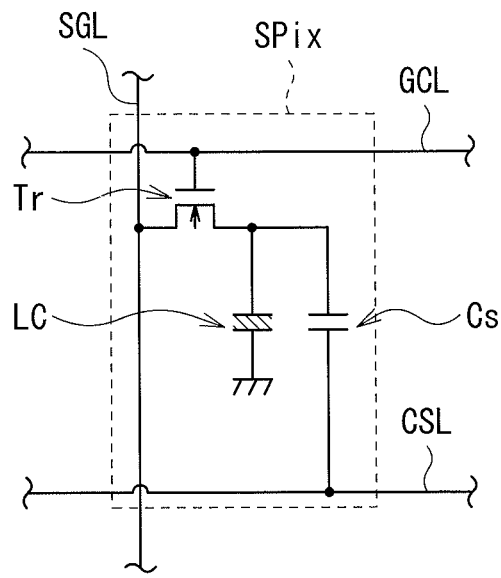
FIG. 4 is a circuit diagram showing a configuration example of the sub-pixel illustrated in FIG. 3.

(A) and (B) of FIG. 9 are each a timing waveform chart showing an operation example of the sub-pixel illustrated in FIG. 4.

FIGS. 10A and 10B are each a schematic diagram showing an operation example of the liquid crystal display section illustrated in FIG. 1.

Figure 11A:
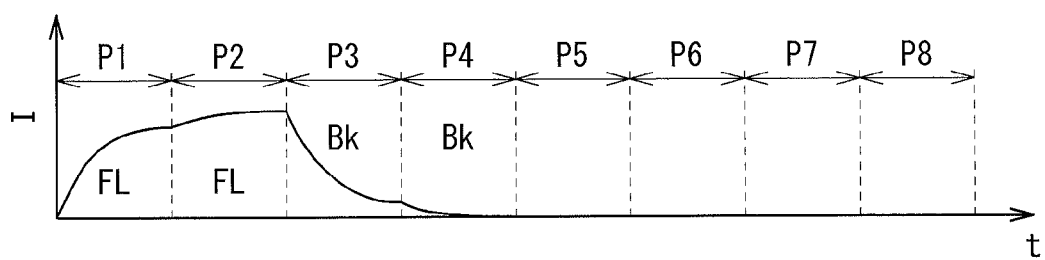

FIG. 11A is a timing waveform chart showing an operation example of a sub-pixel belonging to an odd-numbered line.

Figure 11B:
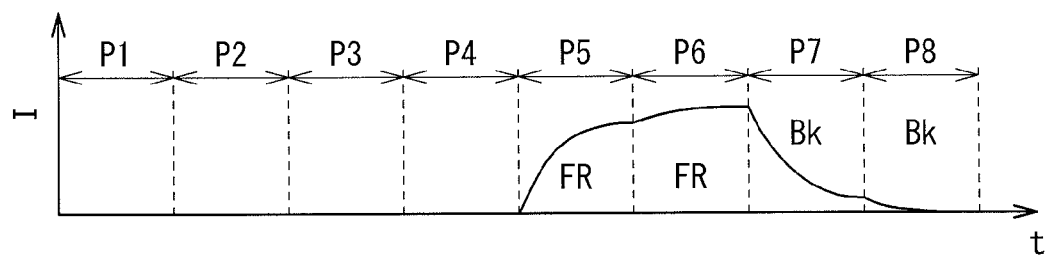

FIG. 11B is a timing waveform chart showing an operation example of a sub-pixel belonging to an even-numbered line.

Figure 12:
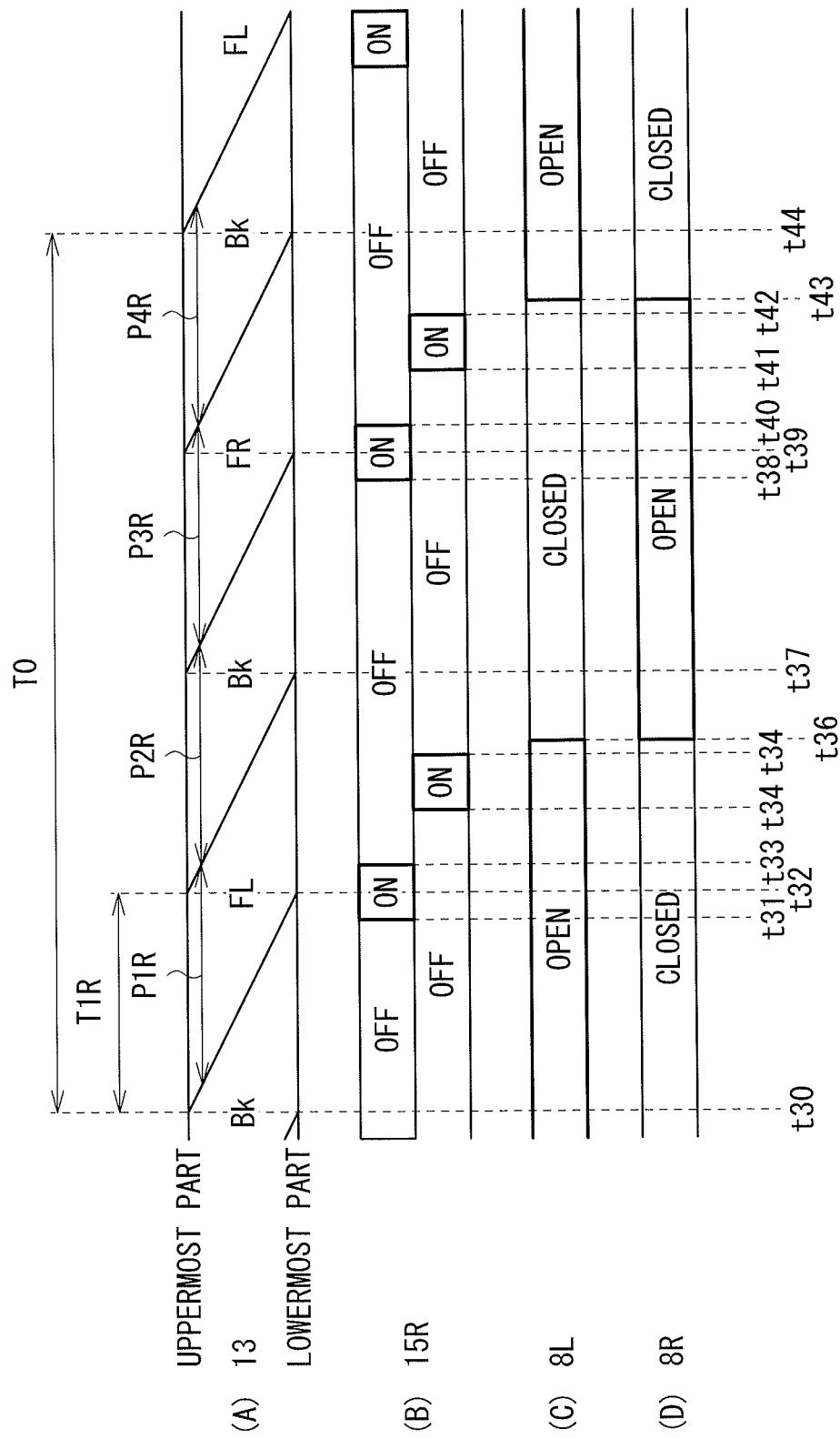

(A), (B), (C), and (D) of FIG. 12 are each a timing waveform chart showing an operation example of a display system according to a comparative example 1.

Figures 13, 14:
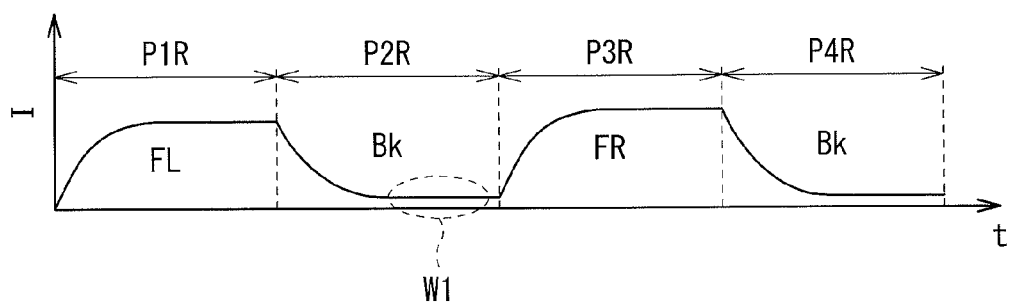

FIG. 13 is a table showing an operation example of the display system illustrated in FIG. 12.

FIG. 14 is a timing waveform chart showing an operation example of a sub-pixel according to the display system illustrated in FIG. 12.

Figure 15:
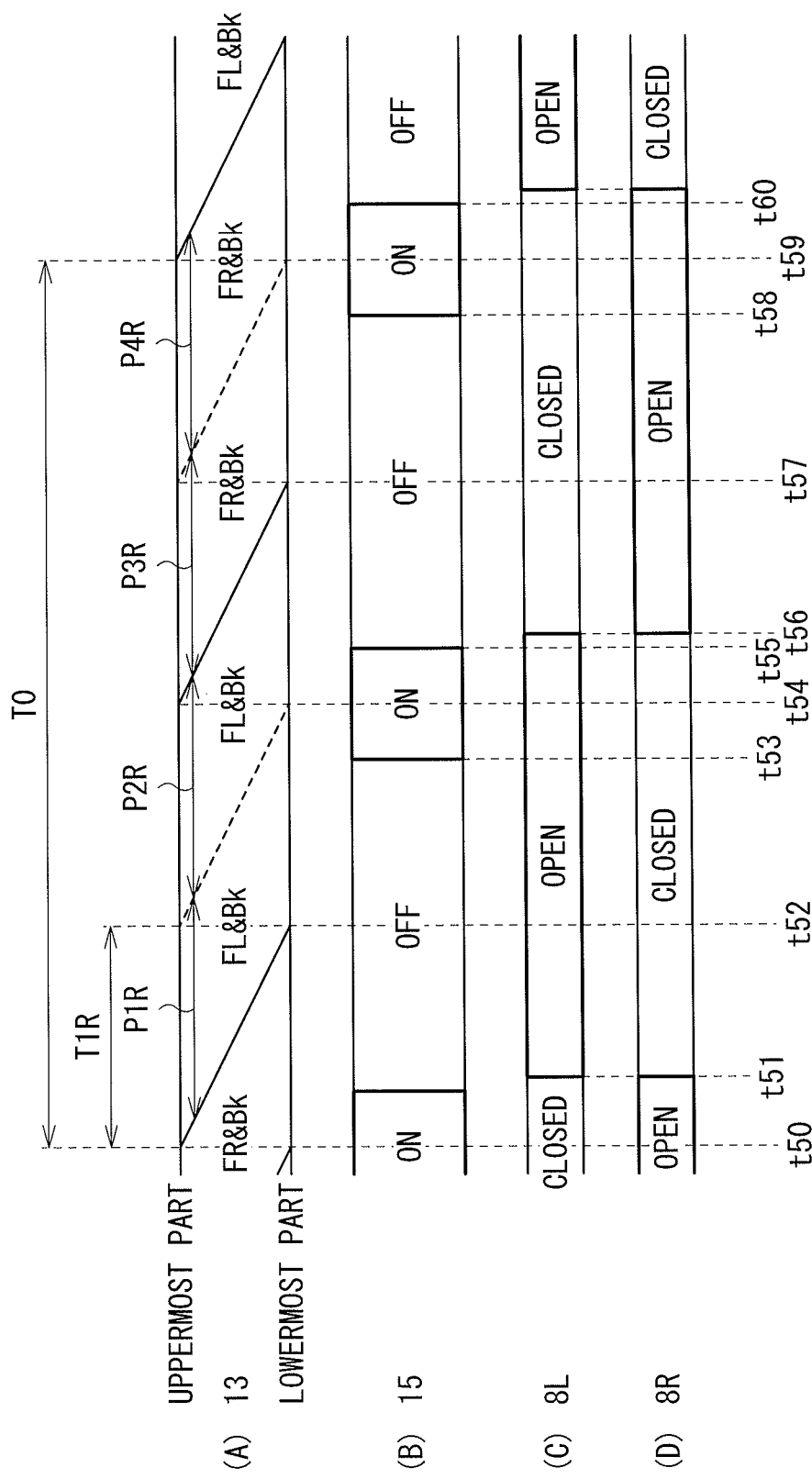

(A), (B), (C), and (D) of FIG. 15 are each a timing waveform chart showing an operation example of a display system according to a comparative example 2.

FIG. 16 is a table showing an operation example of the display system illustrated in FIG. 15.

FIG. 17A is a timing waveform chart showing an operation example of a sub-pixel belonging to an odd-numbered line according to the display system illustrated in FIG. 15.

FIG. 17B is a timing waveform chart showing an operation example of a sub-pixel belonging to an even-numbered line according to the display system illustrated in FIG. 15.

FIG. 18 is a table showing an operation example of a display system according to a modification example of the first embodiment.

Figure 19:
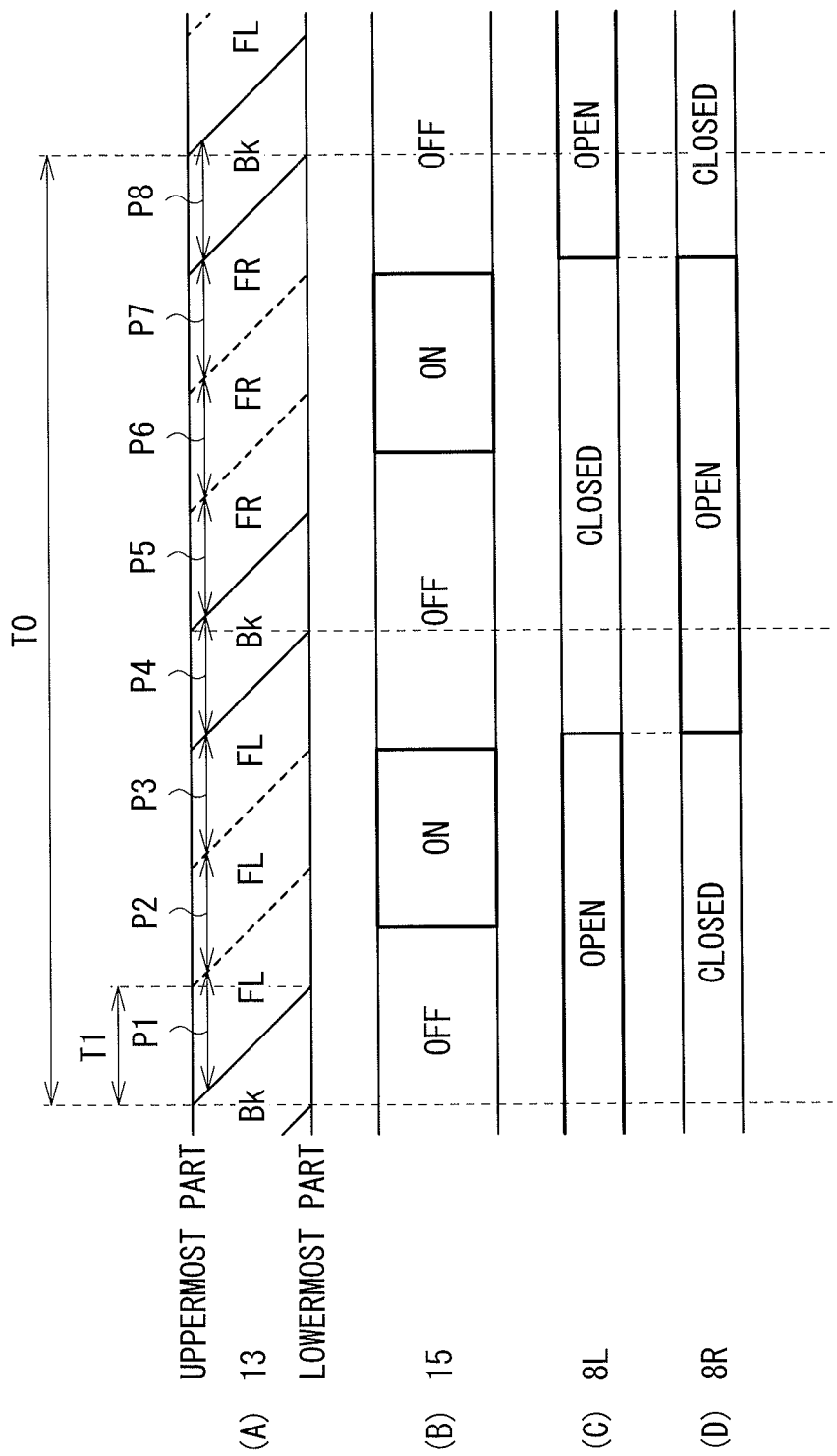

(A), (B), (C), and (D) of FIG. 19 are each a timing waveform chart showing an operation example of a display system according to another modification example of the first embodiment.

FIG. 20 is a table showing an operation example of the display system illustrated in FIG. 19.

Figure 21:
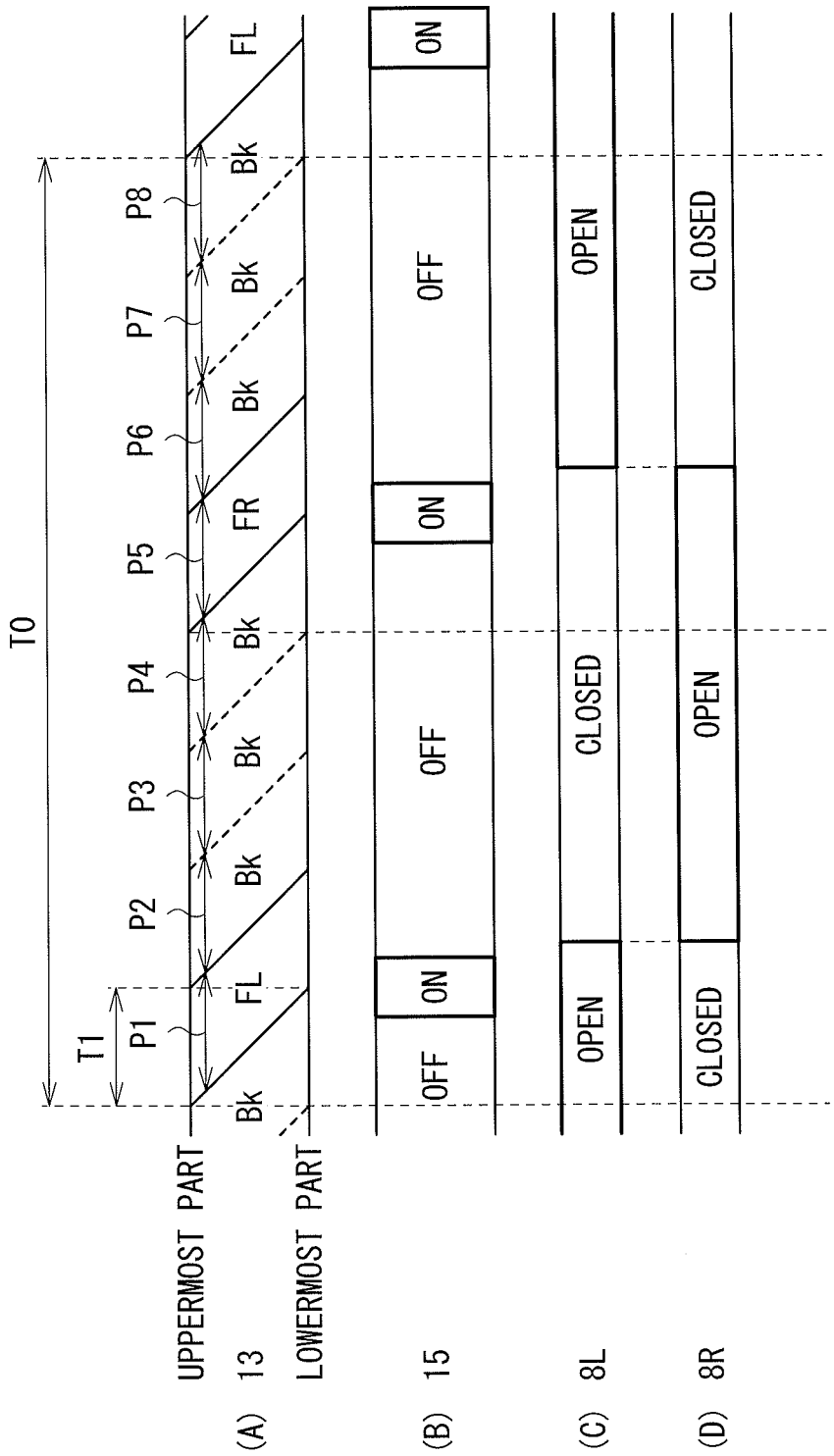

(A), (B), (C), and (D) of FIG. 21 are each a timing waveform chart showing an operation example of a display system according to still another modification example of the first embodiment.

FIG. 22 is a table showing an operation example of the display system illustrated in FIG. 21.

Figure 23:
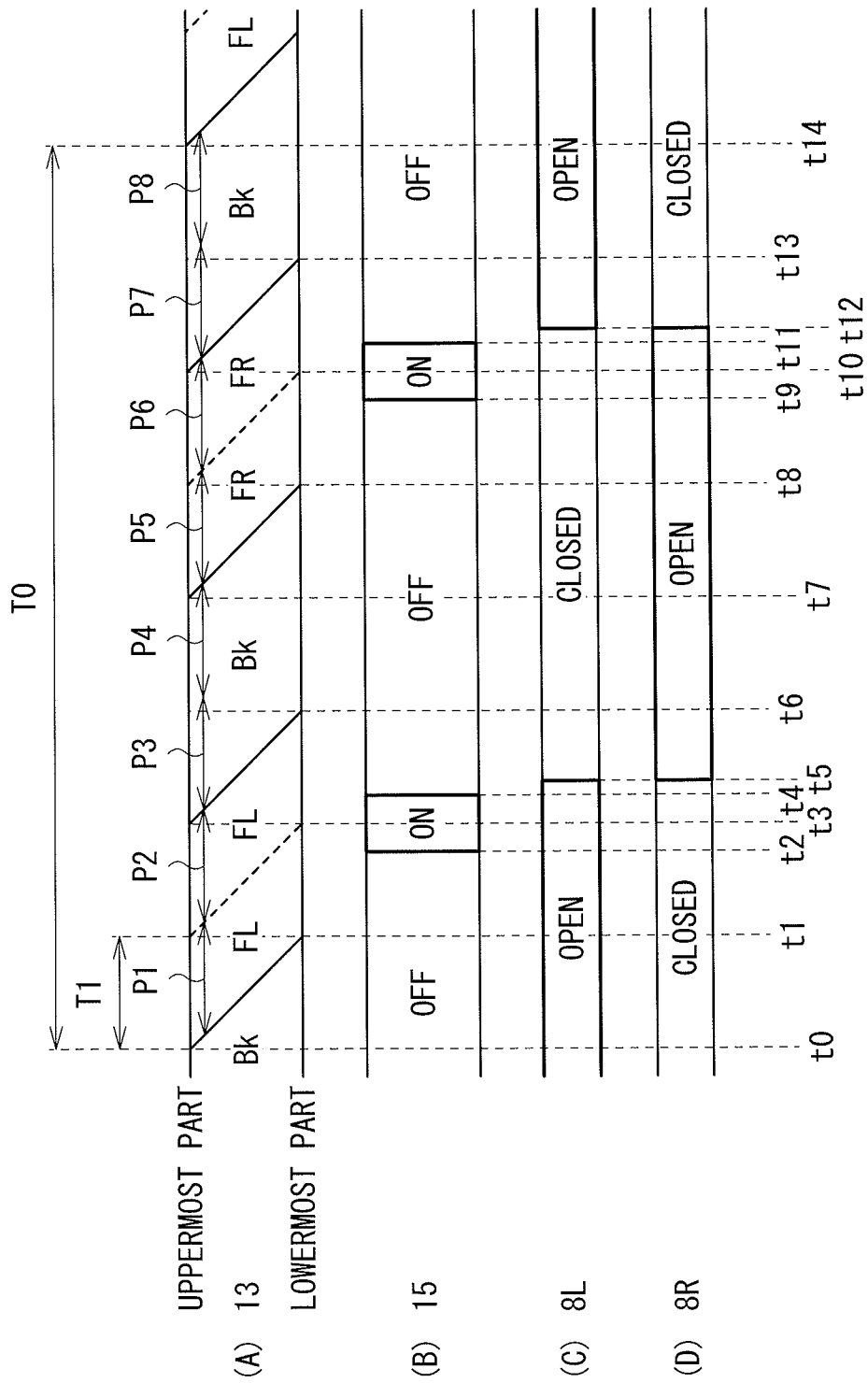

(A), (B), (C), and (D) of FIG. 23 are each a timing waveform chart showing an operation example of a display system according to still another modification example of the first embodiment.

FIG. 24 is a table showing an operation example of the display system illustrated in FIG. 23.

Figure 25:
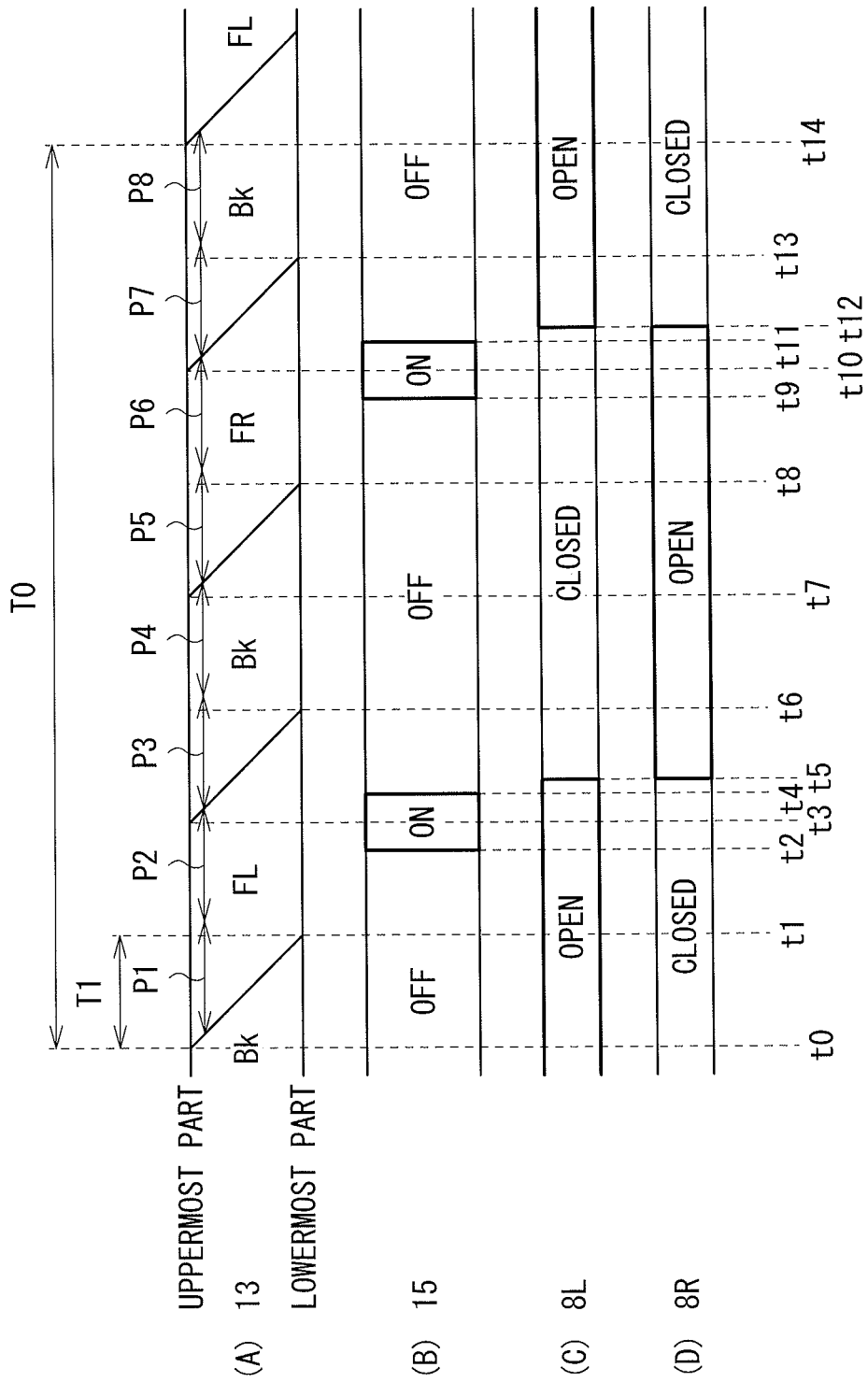

(A), (B), (C), and (D) of FIG. 25 are each a timing waveform chart showing an operation example of a display system according to still another modification example of the first embodiment.

FIG. 26 is a table showing an operation example of the display system illustrated in FIG. 25.

Figure 27:
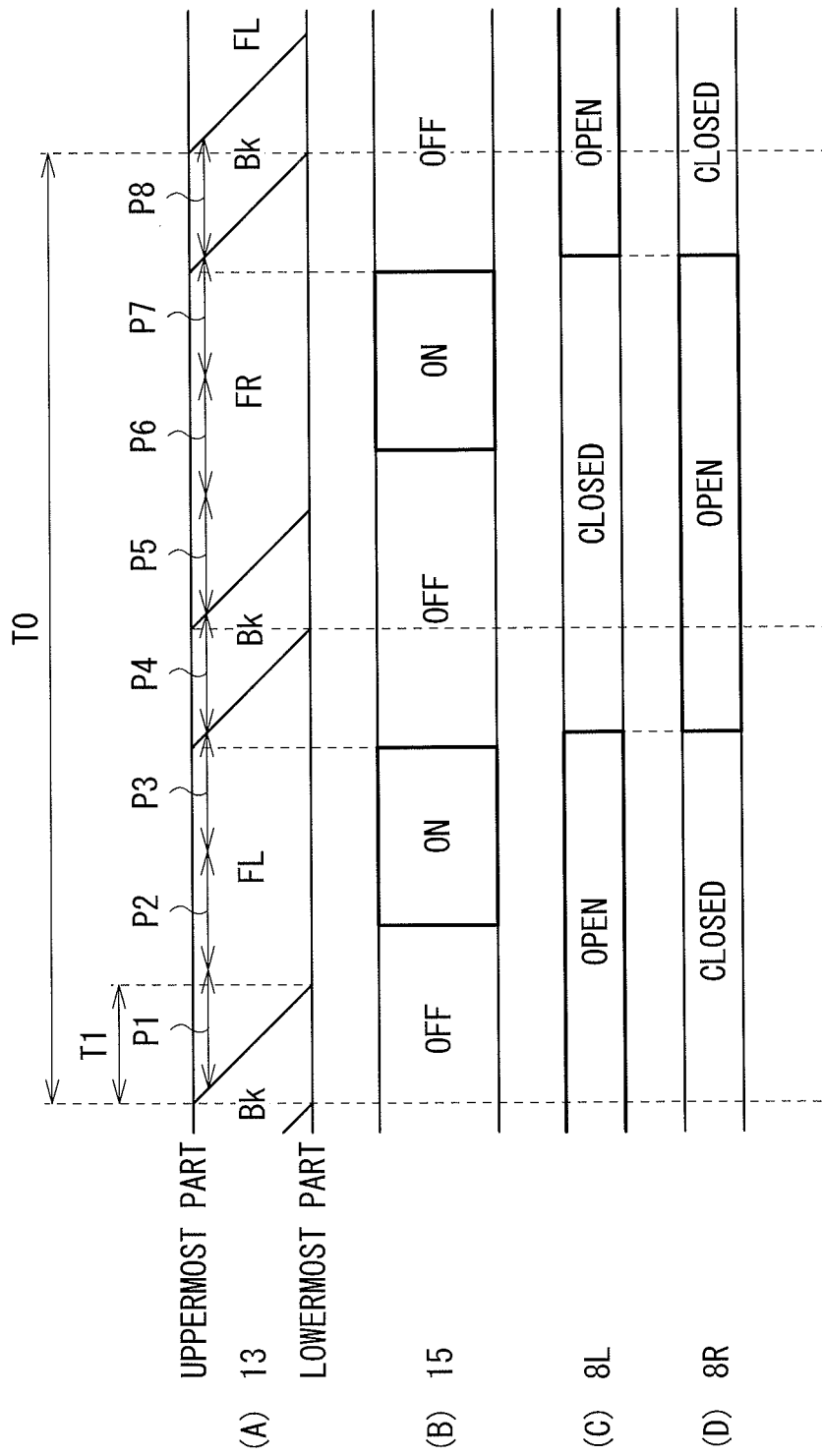

(A), (B), (C), and (D) of FIG. 27 are each a timing waveform chart showing an operation example of a display system according to still another modification example of the first embodiment.

FIG. 28 is a table showing an operation example of the display system illustrated in FIG. 27.

Figure 29:
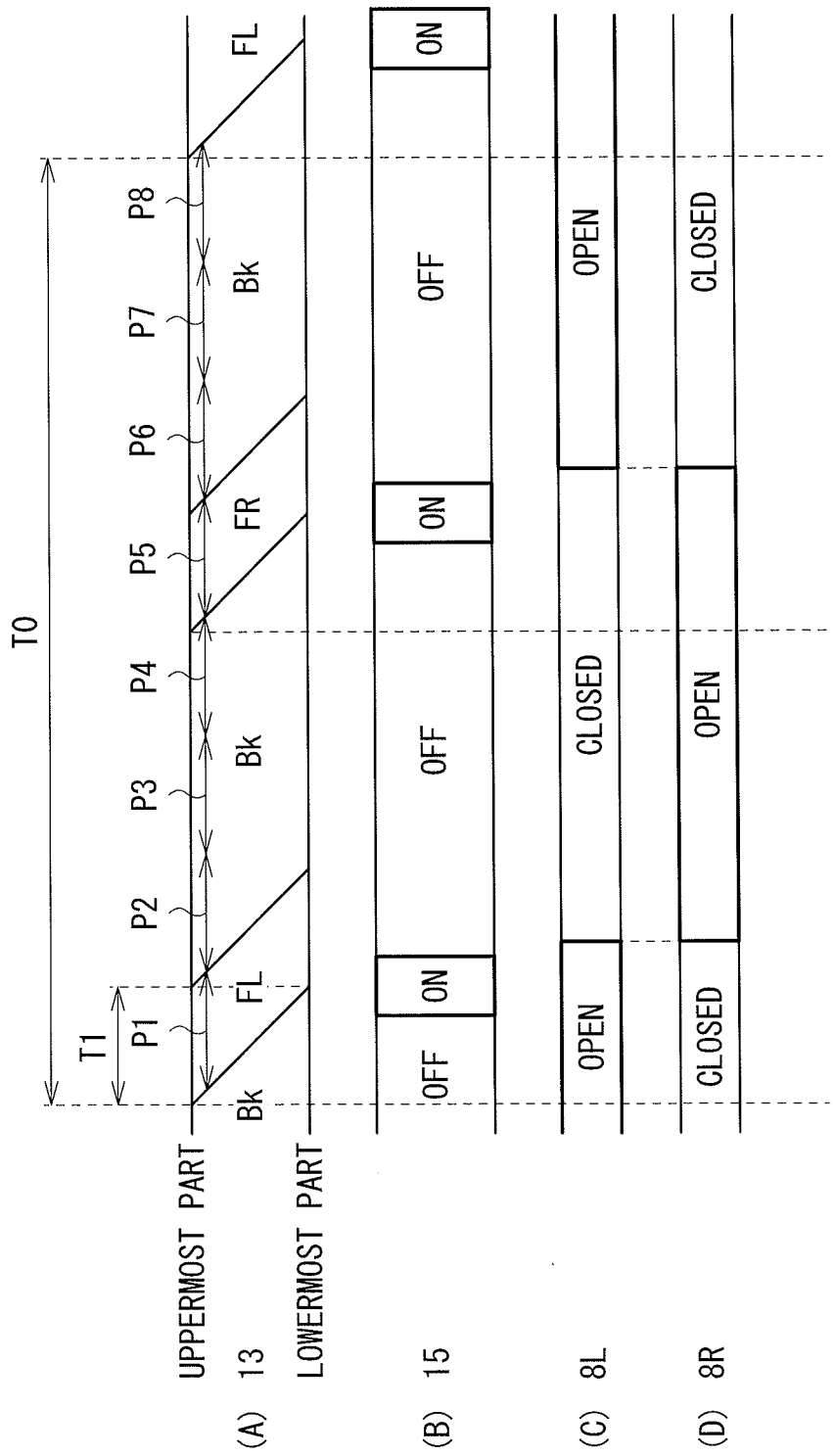

(A), (B), (C), and (D) of FIG. 29 are each a timing waveform chart showing an operation example of a display system according to still another modification example of the first embodiment.

Figures 30, 31:
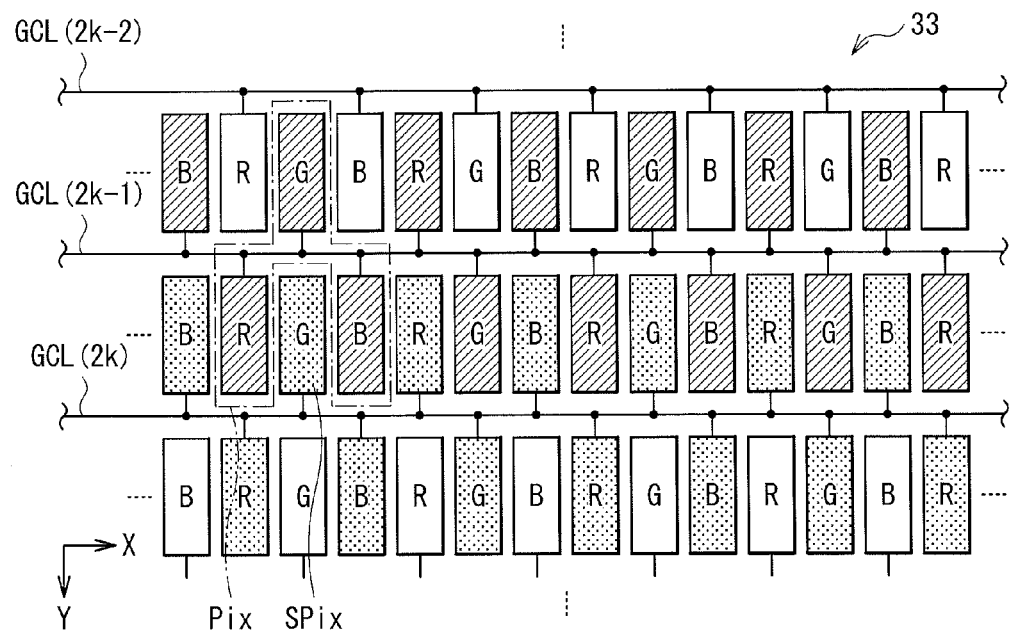

FIG. 30 is a table showing an operation example of the display system illustrated in FIG. 29.

FIG. 31 is an explanatory diagram showing a pixel arrangement on a liquid crystal display section according to a second embodiment of the present disclosure.

Figure 32:
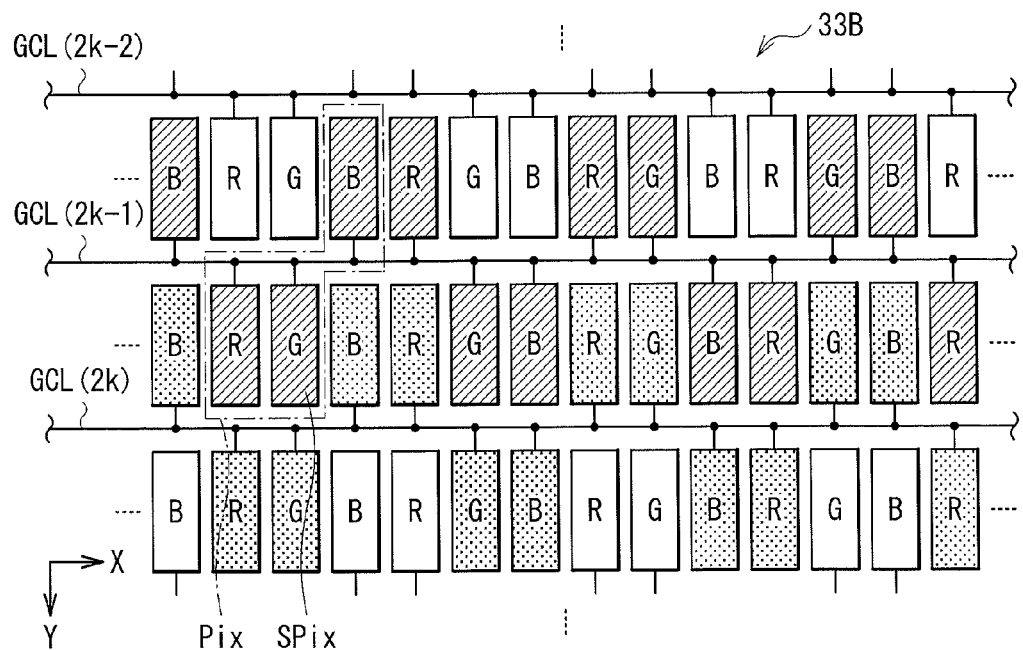

FIG. 32 is an explanatory diagram showing a pixel arrangement on a liquid crystal display section according to a modification example of the second embodiment.

Figure 33:
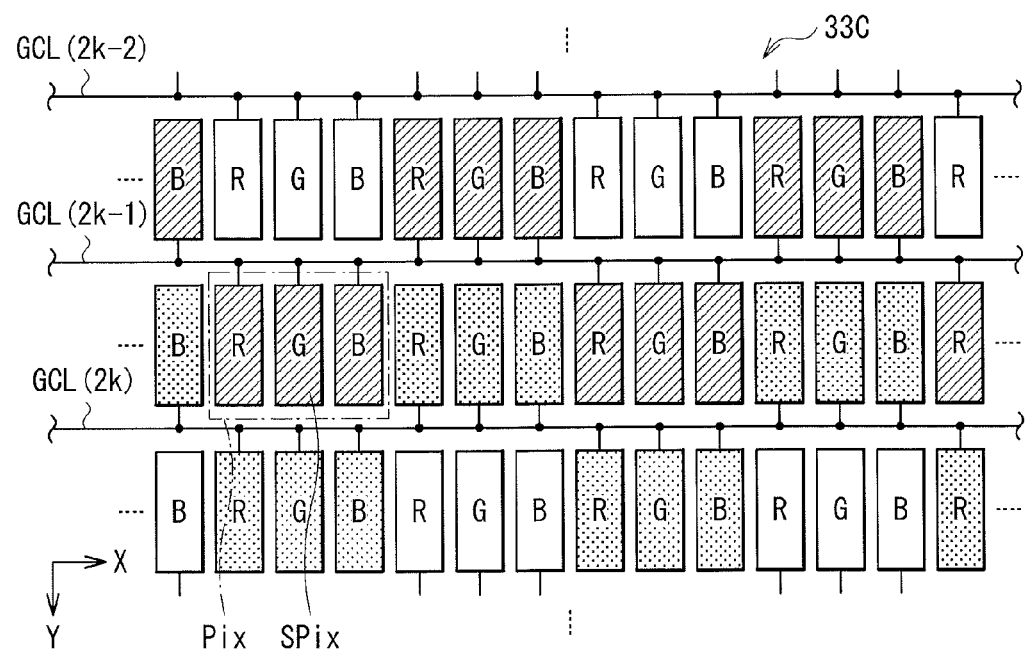

FIG. 33 is an explanatory diagram showing a pixel arrangement on a liquid crystal display section according to another modification example of the second embodiment.

Figure 34:
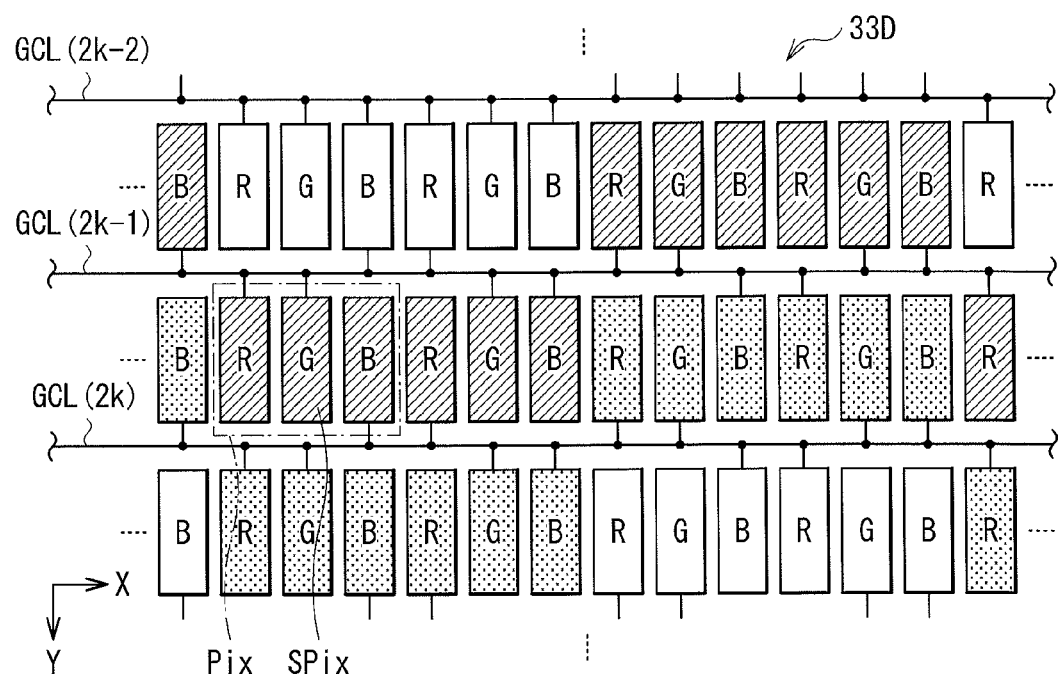

FIG. 34 is an explanatory diagram showing a pixel arrangement on a liquid crystal display section according to still another modification example of the second embodiment o.

Figure 35:
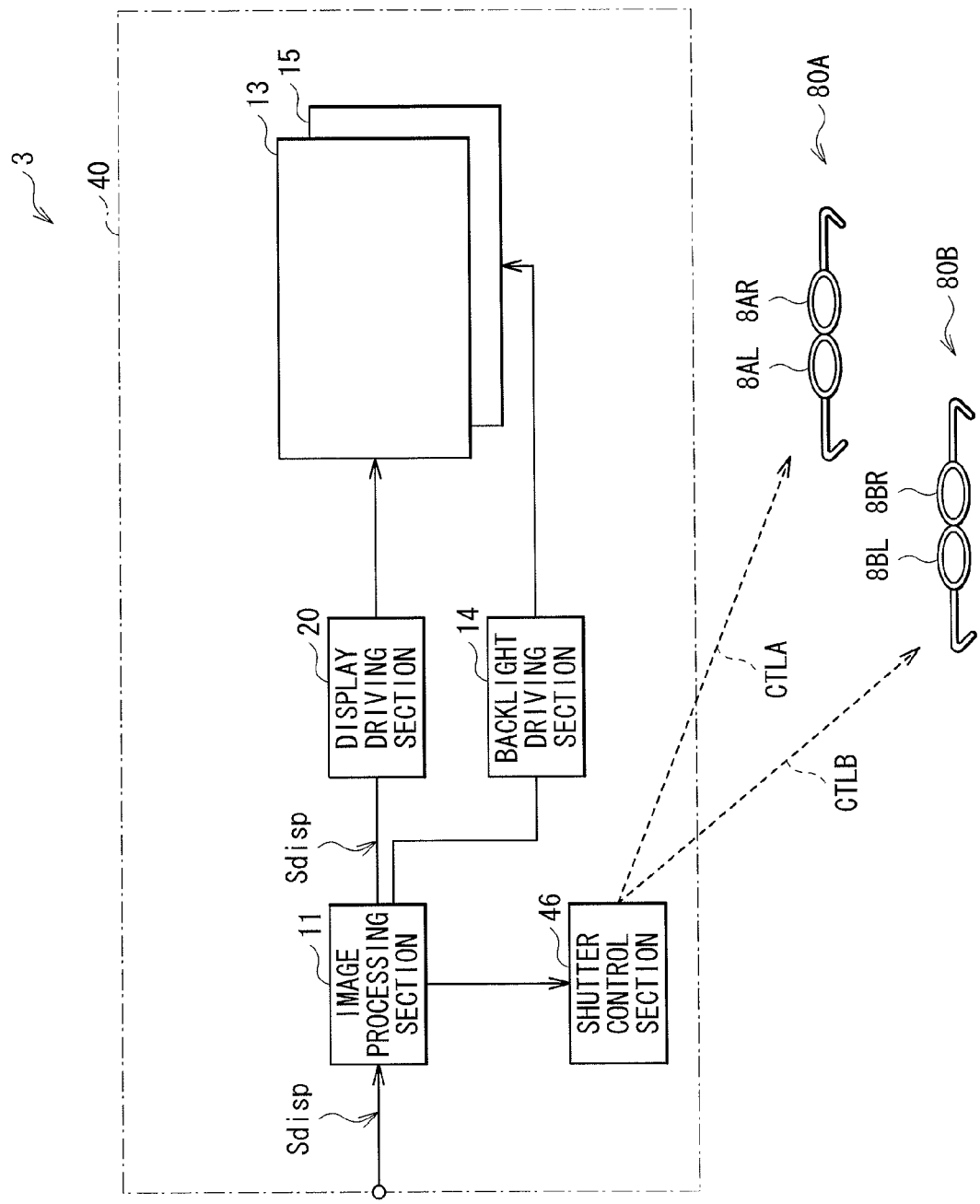

FIG. 35 is a block diagram showing a configuration example of a display system according to a third embodiment of the present disclosure.

Figure 36A:
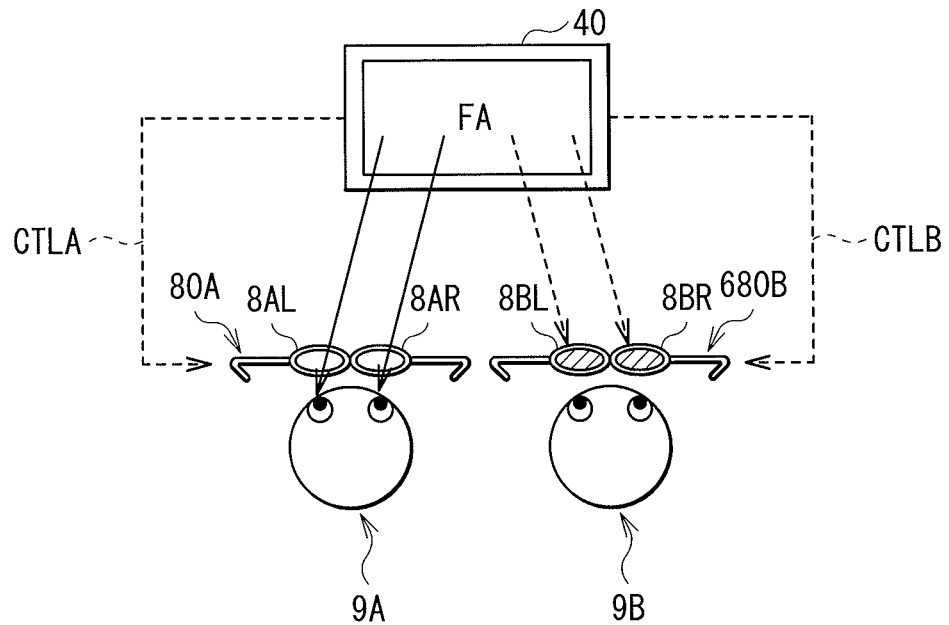

FIG. 36A is an explanatory diagram showing an operation example of the display system illustrated in FIG. 35.

Figure 36B:
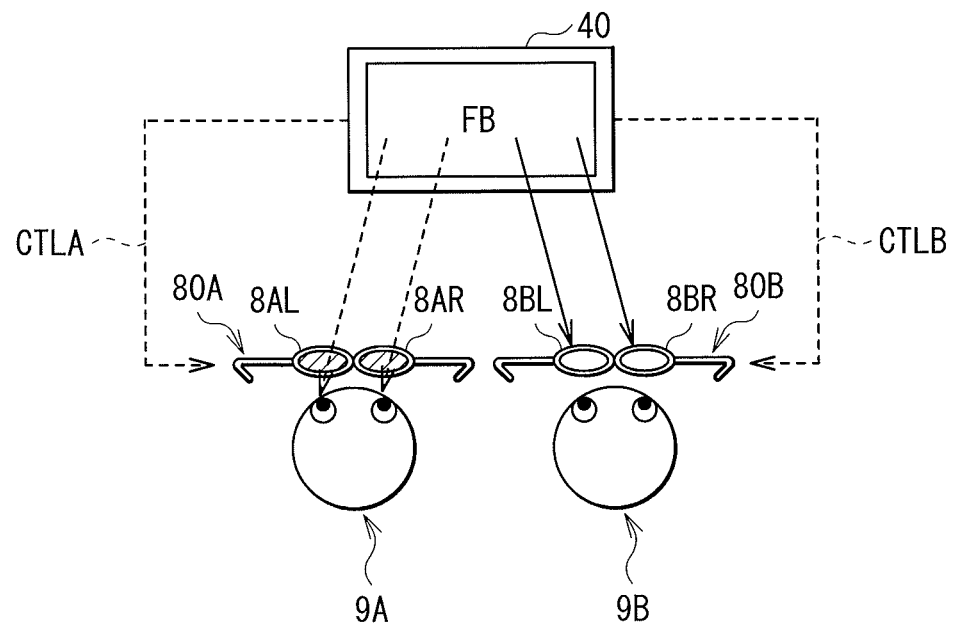

FIG. 36B is an explanatory diagram showing another operation example of the display system illustrated in FIG. 35.

Figure 37:
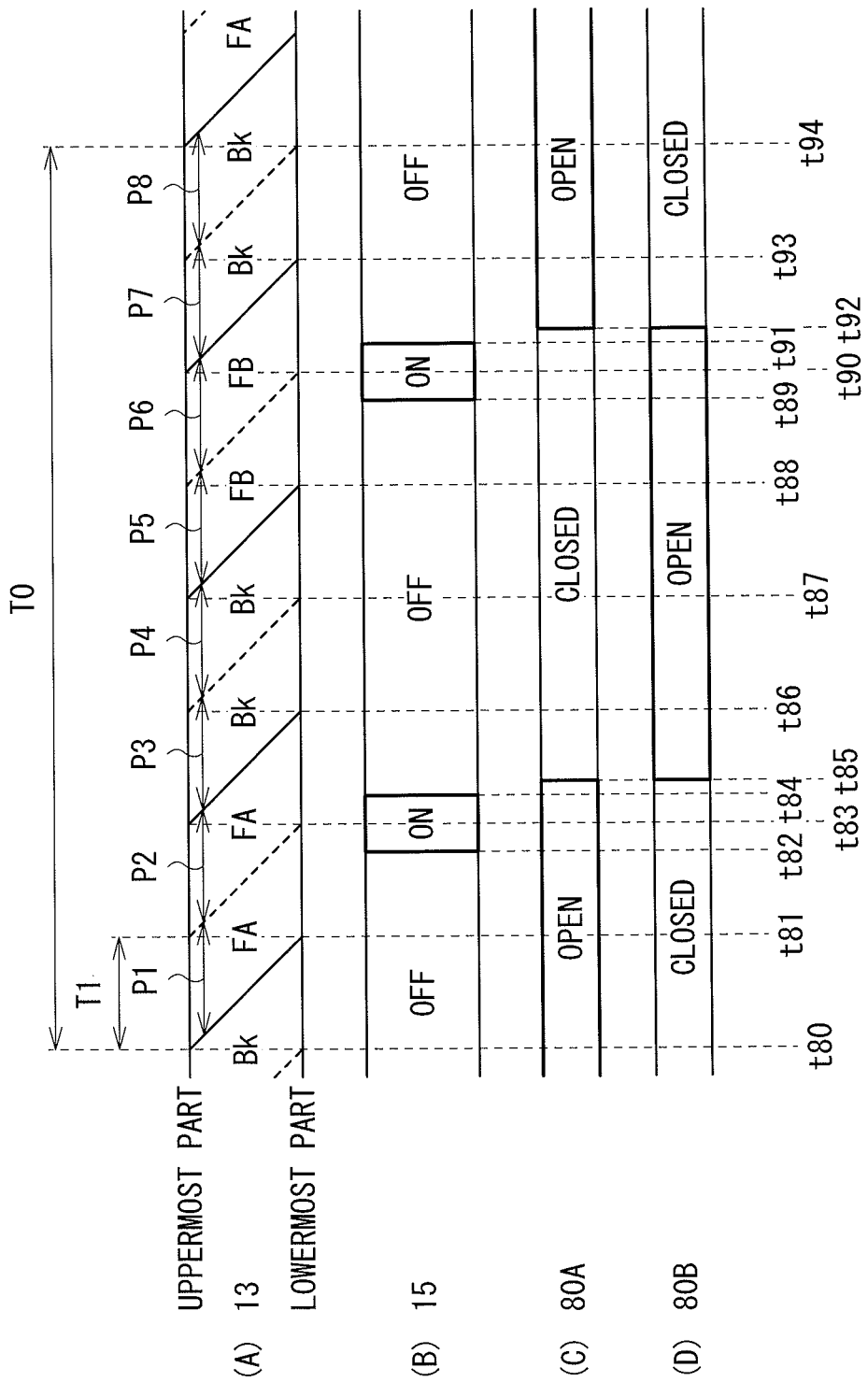

(A), (B), (C), and (D) of FIG. 37 are each a timing waveform chart showing an operation example of the display system illustrated in FIG. 35.

Figures 38, 39:
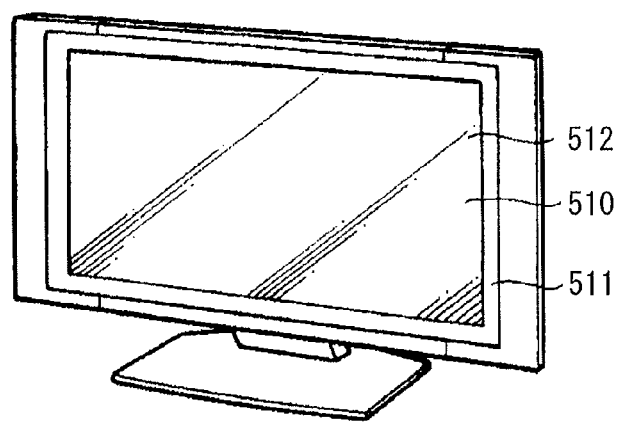

FIG. 38 is a table showing an operation example of the display system illustrated in FIG. 35.

FIG. 39 is a perspective view showing an external appearance of a television receiver to which the display system according to any of the above-described embodiments is applied.

DETAILED DESCRIPTION

Hereinafter, some embodiments of the present disclosure are described in detail with reference to the drawings. It is to be noted that the description is provided in the order given below.
1. First Embodiment (stereoscopic display system)
2. Second Embodiment (stereoscopic display system)
3. Third Embodiment (multi-viewing system)
4. Application Examples
(1. First Embodiment)
[Configuration Example]

FIG. 1 shows a configuration example of a display system 1 according to a first embodiment of the present disclosure. The display system 1 is a display system for carrying out a stereoscopic display. It is to be noted that the display driving circuit and the display driving method according to the embodiments of the present disclosure are also described together because they are embodied with this embodiment of the present disclosure. The display system 1 includes a display unit 10 and shutter glasses 80.

The display unit 10 is provided with an image processing section 11, a display driving section 20, a liquid crystal display section 13, a backlight driving section 14, a backlight 15, and a shutter control section 16.

Based on an image signal Sdisp to be provided externally, the image processing section 11 controls the display driving section 20, the backlight driving section 14, and the shutter control section 16 to share a control signal and operate in synchronization with one another. Hereupon, the image signal Sdisp includes a series of left-eye images FL and right-eye images FR that are arranged alternately.

Further, the image processing section 11 also has a capability to insert a black image Bk between each of the left-eye images FL and each of the right-eye images FR. It is to be noted that such a functional assignment is not limited thereto, although instead of this, for example, the display driving section 20 may have the capability to insert the black image Bk, or alternatively a configuration may be adopted which ensures that a series of images including the left-eye image FL, the right-eye image FR, and the black image Bk is input to the image processing section 11.

The display driving section 20 drives the liquid crystal display section 13 based on an image signal Sdisp2 to be provided from the image processing section 11. The liquid crystal display section 13 drives a liquid crystal display device to modulate light that is emitted from the backlight 15, thereby performing a display. In this example, the liquid crystal display section 13 is a so-called quad-speed display panel.

Figure 2:
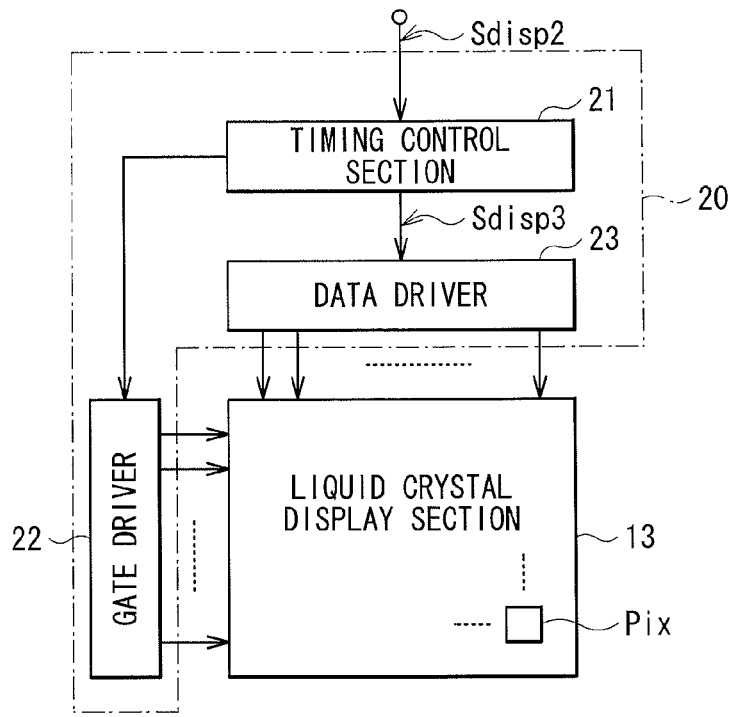
FIG. 2 is a block diagram showing a configuration example of a display driving section illustrated in FIG. 1.

FIG. 2 shows an example of a block diagram for the display driving section 20. The display driving section 20 is provided with a timing control section 21, a gate driver 22, and a data driver 23. The timing control section 21 controls drive timing for the gate driver 22 and the data driver 23, while generating an image signal Sdisp3 based on the image signal Sdisp2 to be provided from the image processing section 11 to provide such an image signal Sdisp3 to the data driver 23. The gate driver 22 sequentially selects pixels Pix within the liquid crystal display section 13 for each row for sequential scanning according to timing control that is performed by the timing control section 21. The data driver 23 provides a pixel voltage Vpix based on the image signal Sdisp3 to each of the pixels Pix within the liquid crystal display section 13. In concrete terms, the data driver 23 generates the pixel voltage Vpix in the form of an analog signal by performing D/A (digital-to-analog) conversion based on the image signal Sdisp3 to provide such a pixel voltage Vpix to each of the pixels Pix.

With this configuration, the display driving section 20 drives the liquid crystal display section 13 by performing a sequential scanning. As described hereinafter, on this occasion, the display driving section 20 drives the liquid crystal display section 13 in a manner of performing a sequential scan only on odd-numbered lines in the liquid crystal display section 13 in displaying the left-eye image FL followed by the black image Bk and of performing a sequential scan only on even-numbered lines in the liquid crystal display section 13 in displaying the right-eye image FR followed by the black image Bk.

Figure 3:
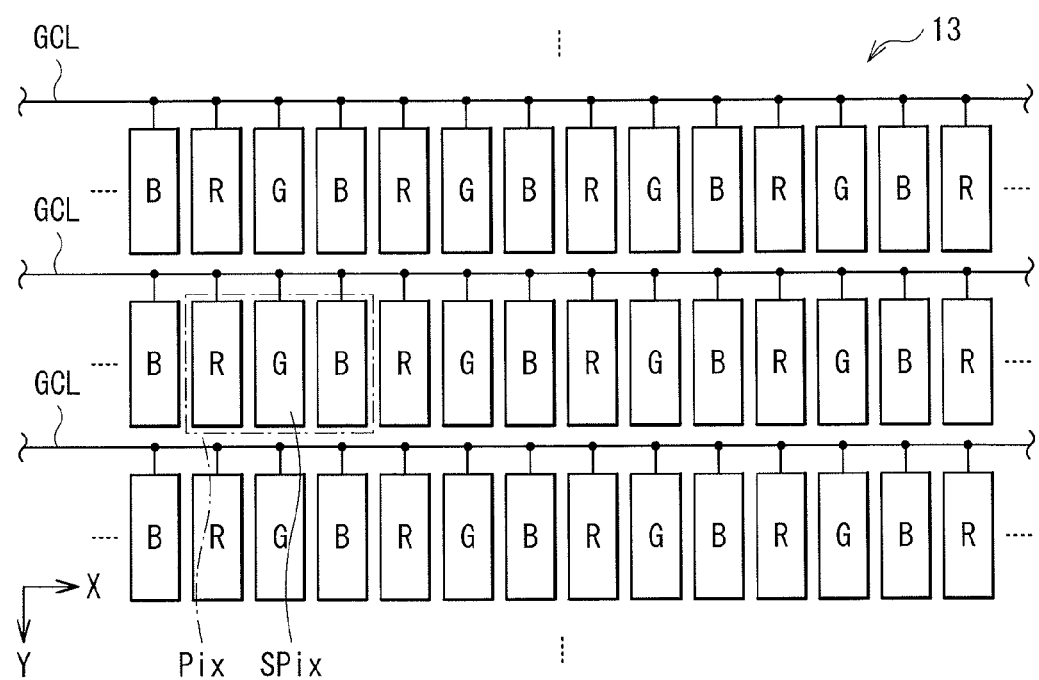
FIG. 3 is an explanatory diagram showing a pixel arrangement on a liquid crystal display section according to a first embodiment of the present disclosure.

FIG. 3 shows a configuration example of the liquid crystal display section 13. In the liquid crystal display section 13, the pixels Pix are arrayed in a matrix pattern. Each of the pixels Pix has three sub-pixels SPix that correspond to a red color (R), a green color (G), and a blue color (B), respectively. In this example, the sub-pixels SPix that are arranged side-by-side in a horizontal direction X are connected with the same gate line GCL (to be hereinafter described).

FIG. 4 shows an example of a circuit diagram for the sub-pixel SPix that configures the pixel Pix. The pixel Pix includes a TFT (Thin-Film Transistor) device Tr, a liquid crystal device LC, and a storage capacitor Cs. The TFT device Tr may be configured of, for example, a MOS (Metal Oxide Semiconductor) type FET (Field-Effect Transistor) with a gate thereof connected to the gate line GCL, with a source thereof connected to a data line SGL, and with a drain thereof connected to an end of the liquid crystal device LC and an end of the storage capacitor Cs. For the liquid crystal device LC, a first end thereof is connected with the drain of the TFT device Tr, while a second end thereof is grounded. For the storage capacitor Cs, a first end thereof is connected with the drain of the TFT device Tr, while a second end is connected with a storage capacitor line CSL. The gate line GCL is connected with the gate driver 22, while the data line SGL is connected with the data driver 23.

Figure 5:
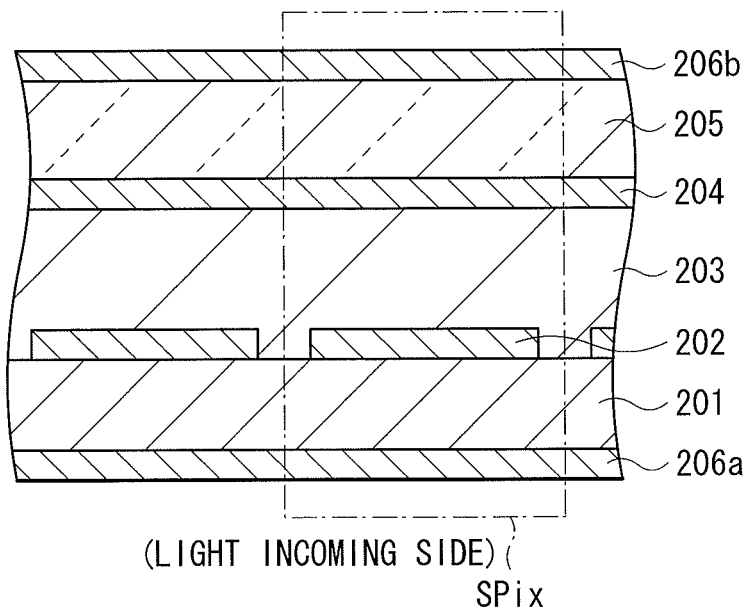
FIG. 5 is a cross-sectional diagram showing a schematic cross-sectional structure of a liquid crystal display section illustrated in FIG. 1.

FIG. 5 shows a cross-sectional structure of the liquid crystal display section 13. The liquid crystal display section 13 has a liquid crystal layer 203 that is sealed between a drive substrate 201 and a facing substrate 205. The drive substrate 201, on which the above-described TFT device Tr and the like (not shown in the figure) are formed, has a pixel electrode 202 that is arranged for each of the sub-pixels SPix thereon. On the facing substrate 205, a color filter and a black matrix that are not shown in the figure are formed, and further a counter electrode 204 is also arranged as an electrode common to the sub-pixels SPix on the surface at the liquid crystal layer 203 side. At a light incoming side and a light outgoing side of the liquid crystal display section 13, polarization plates 206a and 206b are attached to be placed in a crossed Nicols or a parallel Nicols state.

The liquid crystal layer 203, which functions as a so-called VA (Vertical Alignment) liquid crystal in this example, may include, for example, liquid crystal molecules M having negative dielectric anisotropy.

The backlight driving section 14 drives the backlight 15 based on a control signal to be provided from the image processing section 11. More specifically, the backlight driving section 14 drives the backlight 15 to emit light intermittently in synchronization with a display operation in the liquid crystal display section 13.

The backlight 15 has a capability to emit plane emission light to the liquid crystal display section 13. The backlight 15 may be configured using, for example, an LED (Light Emitting Diode), a CCFL (Cold Cathode Fluorescent Lamp), and the like.

The shutter control section 16 generates a shutter control signal CTL based on a control signal to be provided from the image processing section 11, and provides such a shutter control signal CTL to the shutter glasses 80 through a wireless communication. It is to be noted that, in this example, the shutter control section 16 provides the shutter control signal CTL through the wireless communication, although a communication method is not limited thereto, and the shutter control signal CTL may be provided through a wired communication.

A pair of the shutter glasses 80 is an eyeglasses-type shutter device, allowing a viewer (not shown in the figure) to perform a stereoscopic viewing by the use of such a device. The shutter glasses 80 have a left-eye shutter 8L and a right-eye shutter 8R. Each of the left-eye shutter 8L and the right-eye shutter 8R may be configured of, for example, a liquid crystal shutter. A transmitting state (open state) and a shutoff state (closed state) of each of the left-eye shutter 8L and the right-eye shutter 8R are controlled with the shutter control signal CTL that is provided from the shutter control section 16.

Here, the liquid crystal display section 13 corresponds to a specific but not limitative example of a "display section" of the present disclosure. The display driving section 20 corresponds to a specific but not limitative example of a "driving section" of the present disclosure. The gate line GCL corresponds to a specific but not limitative example of a "scanning signal line" of the present disclosure. The left-eye image FL corresponds to a specific but not limitative example of a "first type of frame image" of the present disclosure. The right-eye image FR corresponds to a specific but not limitative example of a "second type of frame image" of the present disclosure.

[Operation and Function]

Subsequently, the description is provided on operation and function of the display system 1 according to the first embodiment.

(Overview of Overall Operation)

First, with reference to FIG. 1, the description is provided on an overview of the overall operation for the display system 1. Based on the image signal Sdisp to be provided externally, the image processing section 11 provides a control signal to each of the display driving section 20, the backlight driving section 14, and the shutter control section 16, and controls them to operate in synchronization with one another. The backlight driving section 14 drives the backlight 15 based on a control signal to be provided from the image processing section 11. The backlight 15 emits plane emission light to the liquid crystal display section 13. The display driving section 20 drives the liquid crystal display section 13 based on the image signal Sdisp2 to be provided from the image processing section 11. The liquid crystal display section 13 performs a display by modulating light that is emitted from the backlight 15. The shutter control section 16 generates the shutter control signal CTL based on a control signal to be provided from the image processing section 11, and provides the shutter control signal CTL to the shutter glasses 80. Each of the left-eye shutter 8L and the right-eye shutter 8R of the shutter glasses 80 performs its opening/closing action based on the shutter control signal CTL.

Figure 6A:
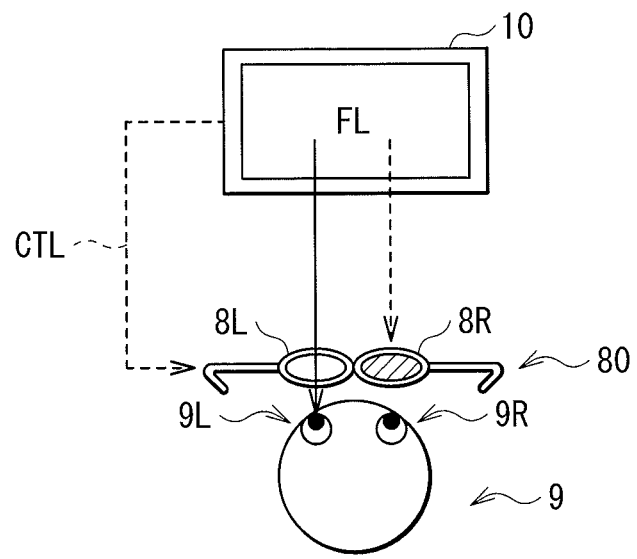
FIG. 6A is an explanatory diagram showing an operation example in the case of a display of a left-eye image.
Figure 6B:
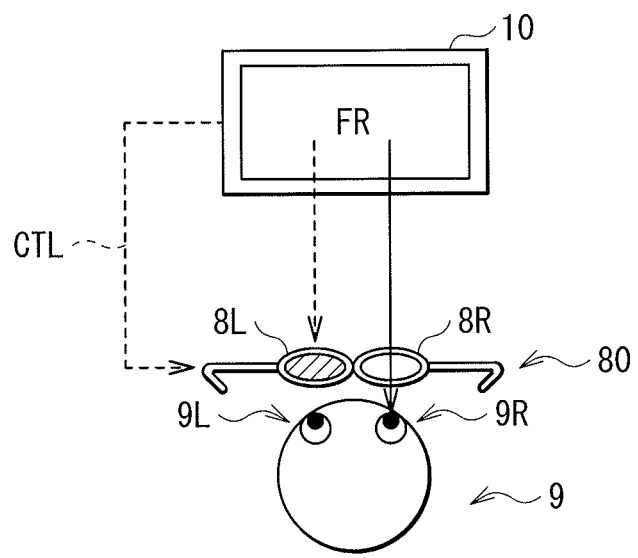
FIG. 6B is an explanatory diagram showing an operation example in the case of a display of a right-eye image.

FIG. 6A and FIG. 6B schematically show an overall operation of the display system 1. FIG. 6A shows an operation in the case of a display of the left-eye image FL, while FIG. 6B shows an operation in the case of a display of the right-eye image FR. When the display unit 10 displays the left-eye image FL, on the shutter glasses 80, the left-eye shutter 8L is put in an open state, while the right-eye shutter 8R is put in a closed state as illustrated in FIG. 6A. Consequently, a viewer 9 views the left-eye image FL with a left eye 9L. On the other hand, when the display unit 10 displays the right-eye image FR, on the shutter glasses 80, the left-eye shutter 8L is put in a closed state, while the right-eye shutter 8R is put in an open state as illustrated in FIG. 6B. Consequently, the viewer 9 views the right-eye image FR with a right eye 9R. When such operations are repeated alternately, because parallax exists between the left-eye image FL and the right-eye image FR, this allows the viewer 9 to perceive an image composed of the series of images as a stereoscopic image with an appearance of depth.

(Detailed Operation)

Subsequently, the description is provided on the detailed operation when a stereoscopic display is carried out.

FIG. 7 shows a timing waveform chart for a display operation of the display system 1, wherein (A), (B), (C), and (D) show operation of the liquid crystal display section 13, operation of the backlight 15, operation of the left-eye shutter 8L of the shutter glasses 80, and operation of the right-eye shutter 8R, respectively. A vertical axis of (A) of FIG. 7 denotes a scan position in a sequential scanning direction of the liquid crystal display section 13. Further, in (A) of FIG. 7, for example, "FL" indicates that the display driving section 20 performs a display driving based on the left-eye image FL, "FR" indicates that the display driving section 20 performs a display driving based on the right-eye image FR, and "Bk" indicates that the display driving section 20 performs a display driving based on the black image Bk. Additionally, in (B) of FIG. 7, "ON" indicates that the backlight 15 turns on, and "OFF" indicates that the backlight 15 turns off.

In the display system 1, a sequential scanning is carried out twice on each of the following images in the order of the left-eye image FL, the black image Bk, the right-eye image FR, and the black image Bk. A display of those images is repeated during every timing cycle T0. Hereupon, the timing cycle T0 may be set to, for example, about 16.7 [msec] (=about 1/60 [Hz]). In this case, a scanning timing cycle T1 for each sequential scanning is about 2.1 [msec] (=T0/8). On each line of the liquid crystal display section 13, an operational state is set up for each of eight periods P1 to P8 corresponding to a sequential scanning ((A) of FIG. 7).

FIG. 8 shows operation of odd-numbered lines and even-numbered lines in the liquid crystal display section 13 during the periods P1 to P8. In FIG. 8, "FL" indicates that the display driving section 20 performs a display driving based on the left-eye image FL, "FR" indicates that the display driving section 20 performs a display driving based on the right-eye image FR, and "Bk" indicates that the display driving section 20 performs a display driving based on the black image Bk. Further, a symbol "-" indicates that the display driving section 20 performs no display driving operation.

Hereinafter, operation of the display system 1 is described in details with reference to (A), (B), (C), and (D) of FIG. 7 as well as FIG. 8.

First, the display unit 10 displays the left-eye image FL during a timing period of t0 to t3. In concrete terms, in the first place, the display driving section 20 performs a first-time sequential scanning based on the left-eye image FL from an uppermost part toward a lowermost part for only the odd-numbered lines of the liquid crystal display section 13 during a timing period of t0 to t1, and performs a second-time sequential scanning based on the left-eye image FL similarly during the following timing period of t1 to t3 ((A) of FIG. 7 and FIG. 8). As described later, such a two-time successive writing of the same image makes it possible to reduce deterioration in the image quality that is caused by the dielectric anisotropy of the liquid crystal molecules M in the liquid crystal display section 13. During this period, on the even-numbered lines of the liquid crystal display section 13, no display driving operation is performed, and the current state is maintained. During this period, the left-eye shutter 8L is put in an open state, and the right-eye shutter 8R is put in a closed state ((C) and (D) of FIG. 7). The backlight 15 turns on during a timing period of t2 to t4 ((B) of FIG. 7). This allows the viewer 9 to view the left-eye image FL with the left eye 9L during the timing period of t2 to t4.

Next, the display unit 10 displays the black image Bk during a timing period of t3 to t7. In concrete terms, in the first place, the display driving section 20 performs a first-time sequential scanning based on the black image Bk from an uppermost part toward a lowermost part for only the odd-numbered lines of the liquid crystal display section 13 during a timing period of t3 to t6, and performs a second-time sequential scanning based on the black image Bk similarly during the following timing period of t6 to t7 ((A) of FIG. 7 and FIG. 8). This makes it possible to fully reset the sub-pixels SPix on the odd-numbered lines. During this period, on the even-numbered lines of the liquid crystal display section 13, no display driving operation is performed, and the current state is maintained. At a timing t5, the left-eye shutter 8L transits from an open state into a closed state, while the right-eye shutter 8R transits from a closed state into an open state ((C) and (D) of FIG. 7).

Subsequently, the display unit 10 displays the right-eye image FR during a timing period of t7 to t10. In concrete terms, in the first place, the display driving section 20 performs a first-time sequential scanning based on the right-eye image FR from an uppermost part toward a lowermost part for only the even-numbered lines of the liquid crystal display section 13 during a timing period of t7 to t8, and performs a second-time sequential scanning based on the right-eye image FR similarly during the following timing period of t8 to t10 ((A) of FIG. 7 and FIG. 8). During this period, on the odd-numbered lines of the liquid crystal display section 13, no display driving operation is performed, and a state where the black image is displayed is maintained. The backlight 15 turns on during a timing period of t9 to t11 ((B) of FIG. 7). This allows the viewer 9 to view the right-eye image FR with the right eye 9R during the timing period of t9 to t11.

Thereafter, the display unit 10 displays the black image Bk during a timing period of t10 to t14. In concrete terms, in the first place, the display driving section 20 performs a first-time sequential scanning based on the black image Bk from an uppermost part toward a lowermost part for only the even-numbered lines of the liquid crystal display section 13 during a timing period of t10 to t13, and performs a second-time sequential scanning based on the black image Bk similarly during the following timing period of t13 to t14 ((A) of FIG. 7 and FIG. 8). This makes it possible to fully reset the sub-pixels SPix on the even-numbered lines. During this period, on the odd-numbered lines of the liquid crystal display section 13, no display driving operation is performed, and a state where the black image is displayed is maintained. At a timing t12, the left-eye shutter 8L transits from a closed state into an open state, while the right-eye shutter 8R transits from an open state to a closed state ((C) and (D) of FIG. 7).

Afterward, by repeating the operations during a timing period of t0 to t14 as described above, the display system 1 carries out a display in a time-divisional manner in the order of the left-eye image FL, the black image Bk, the right-eye image FR, and the black image Bk.

Next, with attention focused on a certain sub-pixel SPix, the description is provided on a writing operation of a pixel voltage Vpix onto the sub-pixel SPix.

FIG. 9 represents operation of the sub-pixel SPix, wherein (A) shows a timing waveform of a voltage on the gate line GCL, and (B) shows luminance I on the sub-pixel SPix. This example shows a case where the pixel voltage Vpix based on the left-eye image FL is written during each of periods P1 and P2.

In the sub-pixel SPix, after the period P1 starts first, a voltage on the gate line GCL is placed into high level ((A) of FIG. 9), and the TFT device Tr turns on during a timing period of t20 to t21. Subsequently, the data driver 23 provides the pixel voltage Vpix to the sub-pixel SPix via the data line SGL, resulting in the pixel voltage Vpix being written into the sub-pixel SPix. Thereafter, at a timing t21, the voltage on the gate line GCL transits from high level to low level ((A) of FIG. 9), and the TFT device Tr turns off. This separates the sub-pixel SPix from the data line SGL to be placed into a floating state. Then, the liquid crystal molecules M change orientation thereof in response to the written pixel voltage Vpix, leading to variation in the luminance I during a timing period of t20 to t22 ((B) of FIG. 9). This puts the period P1 to an end.

Subsequently, in the sub-pixel SPix, the period P2 starts, and as with a case of the period P1, the data driver 23 provides the same pixel voltage Vpix as with the period P1 once again during a timing period of t22 to t23, resulting in the pixel voltage Vpix being written into the sub-pixel SPix. Then, the liquid crystal molecules M change orientation thereof in response to the written pixel voltage Vpix, leading to variation in the luminance I during a timing period of t22 to t24.

As described above, in the display system 1, in writing the pixel voltage Vpix, the same pixel voltage Vpix is written twice successively. As described below, this makes it possible to suppress deterioration in the image quality that is caused by the dielectric anisotropy of the liquid crystal molecules M in the liquid crystal display section 13.

FIGS. 10A and 10B illustrate orientation of the liquid crystal molecules M in the liquid crystal display section 13, wherein FIG. 10A shows a case where a potential difference ΔV between a pixel electrode 202 and a counter electrode 204 is "0", and FIG. 10B shows a case where the potential difference ΔV is set to a large value.

When the potential difference ΔV between the pixel electrode 202 and the counter electrode 204 is "0", a longitudinal direction of each of the liquid crystal molecules M is oriented toward a direction vertical to a substrate surface as shown in FIG. 10A. On the other hand, when the potential difference ΔV is set to a large value, the longitudinal direction of each of the liquid crystal molecules M is oriented toward a direction parallel to a substrate surface as shown in FIG. 10B.

In such two status, a capacitance Clc between the pixel electrode 202 and the counter electrode 204 varies based on the dielectric anisotropy of the liquid crystal molecules M. In other words, because the dielectric constant of the liquid crystal molecules M is small in a longitudinal direction, and is large in a direction vertical to the longitudinal direction, the capacitance Clc varies depending on orientation of the liquid crystal molecules M. In concrete terms, when the potential difference ΔV is "0" (FIG. 10A), the capacitance Clc becomes small, and becomes larger as the potential difference ΔV increases (FIG. 10B).

In such a manner, the capacitance Clc varies depending on the orientation of the liquid crystal molecules M, and thus when the pixel voltage Vpix is written into the sub-pixel SPix only once, it is likely that the luminance I would not reach a desired value. More specifically, as shown in (A) and (B) of FIG. 9, for example, during a timing period of t21 to t22, when the orientation of the liquid crystal molecules M is changed, the capacitance Clc varies, as described above. Since the sub-pixel SPix is put into a floating state, and the charge is stored, for example, if the capacitance Clc increases, the pixel voltage Vpix decreases accordingly. As a result, in the sub-pixel SPix, it is likely that the luminance I would not reach a desired value.

On the other hand, in the first embodiment, as shown in FIGS. 7 to 9, the same pixel voltage Vpix is written twice successively, and thus even though the pixel voltage Vpix is decreased after a first-time writing, it is possible to compensate for any effect of the dielectric anisotropy by writing the pixel voltage Vpix again a second time, which allows the luminance I to reach a desired value.

Further, in the first embodiment, when the left-eye image FL and the following black image Bk are displayed, a sequential scanning is performed only on the odd-numbered lines in the liquid crystal display section 13, and when the right-eye image FR and the following black image Bk are displayed, a sequential scanning is performed only on the even-numbered lines in the liquid crystal display section 13. This makes it possible to reduce by half the number of lines to be scanned, which allows a scanning timing cycle T1 to be shortened to assure the time for the second-time sequential scanning.

Additionally, in the display system 1, a line for displaying the left-eye image FL and a line for displaying the right-eye image FR are different from each other. As described below, this allows the image quality to be enhanced.

FIG. 11A and FIG. 11B illustrate operation of the sub-pixel SPix, wherein FIG. 11A shows the luminance I in the sub-pixel SPix belonging to a certain odd-numbered line, while FIG. 11B shows the luminance I in the sub-pixel SPix belonging to an even-numbered line next to this odd-numbered line.

As shown in FIG. 11A, the sub-pixel SPix belonging to the odd-numbered line performs a display based on the left-eye image FL during periods P1 and P2, and performs a display based on the black image Bk during periods P3 and P4. Subsequently, during periods P5 to P8, the sub-pixel SPix remains in the same state as with the period P4 because it is not driven as shown in FIG. 8 and the like. On the other hand, as shown in FIG. 11B, the sub-pixel SPix belonging to the even-numbered line remains in a previous state during periods P1 to P4 because it is not driven as shown in FIG. 8 and the like. Thereafter, it performs a display based on the right-eye image FR during periods P5 and P6, and performs a display based on the black image Bk during periods P7 and P8.

In such a manner, in the display system 1, a line for displaying the left-eye image FL and a line for displaying the right-eye image FR are different from each other. Consequently, as described in detail in contrast with comparative examples hereinafter, this makes it possible to reduce any possibility that a crosstalk in which the left-eye image FL and the right-eye image FR get mixed would occur, which allows the image quality to be enhanced.

Next, a function of the first embodiment is described in contrast with comparative examples.

COMPARATIVE EXAMPLE 1

In a comparative example 1, a display system 1R is configured using a display driving section 20R that performs a line sequential scanning on all the lines. Further, the display system 1R is provided with a backlight 15R capable of emitting light independently at an upper half part and a lower half part. It is to be noted that any component parts essentially same as those of the display system 1 according to the first embodiment are denoted with the same reference numerals, and the related descriptions are omitted as appropriate.

FIG. 12 shows a timing waveform chart for a display operation of the display system 1R, wherein (A), (B), (C), and (D) show operation of the liquid crystal display section 13, operation of the backlight 15R, operation of the left-eye shutter 8L of the shutter glasses 80, and operation of the right-eye shutter 8R, respectively. In the display system 1R, a sequential scanning is carried out once on each of the following images in the order of the left-eye image FL, the black image Bk, the right-eye image FR, and the black image Bk. A scanning timing cycle T1R for each sequential scanning is about 4.2 [msec] (=T0/4) when a timing cycle T0 is about 16.7 [msec]. On each line of the liquid crystal display section 13, driving is performed for each of four periods P1R to P4R ((A) of FIG. 12) that correspond to a sequential scanning.

FIG. 13 shows operation of each line in the liquid crystal display section 13 during each of the periods P1R to P4R. Unlike the case of the above-described first embodiment (FIG. 8), the display driving section 20R carries out a display driving for each line without fail.

First, the display driving section 20R performs a sequential scanning based on the left-eye image FL on each line of the liquid crystal display section 13 during a timing period of t30 to t32 ((A) of FIG. 12 and FIG. 13). During this period, the left-eye shutter 8L is put in an open state, and the right-eye shutter 8R is put in a closed state ((C) and (D) of FIG. 12). For the backlight 15R, an upper half part thereof turns on during a timing period of t31 to t33, and a lower half part thereof turns on during a timing period of t34 to t35 ((B) of FIG. 12). Next, the display driving section 20R performs a sequential scanning based on the black image Bk on all the lines of the liquid crystal display section 13 during a timing period of t32 to t37 ((A) of FIG. 12 and FIG. 13). At a timing t36, the left-eye shutter 8L transits from an open state to a closed state, and the right-eye shutter 8R transits from a closed state to an open state ((C) and (D) of FIG. 12). Similarly, the display driving section 20R performs a sequential scanning based on the right-eye image FR during a timing period of t37 to t39, and performs a sequential scanning based on the black image Bk during a timing period of t39 to t44 ((A) of FIG. 12 and FIG. 13).

FIG. 14 shows operation of the sub-pixel SPix according to the comparative example 1. The sub-pixel SPix performs a display based on the left-eye image FL during a period P1R, and performs a display based on the black image Bk during a period P2R. Subsequently, the sub-pixel SPix performs a display based on the right-eye image FR during a period P3R, and performs a display based on the black image Bk during a period P4R.

As shown in FIGS. 12 to 14, in the display system 1R according to the comparative example 1, the display driving section 20R performs a line sequential scanning once on each of the following images in the order of the left-eye image FL, the black image Bk, the right-eye image FR, and the black image Bk. At this time, each sub-pixel SPix performs a display based on the left-eye image FL and the right-eye image FR in a time-divisional manner. Consequently, it is likely that this would bring about a crosstalk in which the left-eye image FL and the right-eye image FR get mixed. In concrete terms, as shown in FIG. 14, even though the display driving section 20R writes the pixel voltage Vpix representing the black image into the sub-pixel SPix during a period P2R, there is a possibility that the luminance I would not reach "0" because the capacitance Clc varies depending on the orientation of the liquid crystal molecules M, as previously described (waveform W1). In this case, during the following period P3R, writing of the pixel voltage Vpix based on the right-eye image FR may be affected, which would possibly bring about a crosstalk in which a residual image (waveform W1) of the left-eye image FL during the period P2R and the right-eye image FR during the period P3R get mixed, resulting in the image quality being deteriorated.

On the contrary, in the display system 1 according to the first embodiment, the left-eye image FL is displayed on the odd-numbered lines, while the right-eye image FR is displayed on the even-numbered lines, and thus it is possible to reduce any possibility of occurrence of a crosstalk, which allows the image quality to be enhanced.

Further, in the display system 1R according to the comparative example 1, a line sequential scanning is carried out once for each of the following images in the order of the left-eye image FL, the black image Bk, the right-eye image FR, and the black image Bk. Therefore, to improve the image quality, as shown in FIG. 12, it is necessary to divide the backlight 15R into a plurality of parts (upper half part and lower half part in this example) for independent light emission (so-called scan backlight), which complicates operation to increase the possibility of increased costs.

On the other hand, in the display system 1 according to the first embodiment, a line sequential scanning is carried out twice for each of the relevant images, and thus, as shown in FIG. 7, this allows the backlight 15 to emit light intermittently as a single integrated constituent, which enables operation to be made simpler and costs to be reduced.

It is to be noted that, for example, when increased costs may be acceptable, a scan backlight may be applicable to the display unit 10. In this case, it is possible to reduce any crosstalk in which the left-eye image FL and the right-eye image FR get mixed, as well as to extend a turn-on period of time of the backlight, which allows the luminance as the display unit to be enhanced.

COMPARATIVE EXAMPLE 2

A comparative example 2 configures a display system 1S using a display driving section 20S that performs a sequential scanning on the odd-numbered lines and the even-numbered lines based on each of different images. It is to be noted that any component parts essentially same as those of the display system 1 according to the first embodiment are denoted with the same reference numerals, and the related description is omitted as appropriate.

FIG. 15 shows a timing waveform chart for a display operation of the display system 1S, wherein (A), (B), (C), and (D) show operation of the liquid crystal display section 13, operation of the backlight 15, operation of the left-eye shutter 8L of the shutter glasses 80, and operation of the right-eye shutter 8R, respectively. FIG. 16 shows operation of each line in the liquid crystal display section 13 during each of periods P1R to P4R. In (A) of FIG. 15, "FL & Bk" denotes that the display driving section 20S performs display driving based on the left-eye image FL on the odd-numbered lines, and performs display driving based on the black image Bk on the even-numbered lines, as shown in FIG. 16. Further, "FR & Bk" denotes that the display driving section 20S performs display driving based on the black image Bk on the odd-numbered lines, and performs display driving based on the right-eye image FR on the even-numbered lines.

First, the display driving section 20S carries out a first-time line sequential scanning by performing display driving based on the left-eye image FL on the odd-numbered lines of the liquid crystal display section 13 and by performing display driving based on the black image Bk on the even-numbered lines during a timing period of t50 to t52, and carries out a second-time line sequential scanning similarly during a timing period of t52 to t54 ((A) of FIG. 15 and FIG. 16). At a timing t51, the left-eye shutter 8L transits from a closed state to an open state, while the right-eye shutter 8R transits from an open state to a closed state ((C) and (D) of FIG. 15). The backlight 15R turns on during a timing period of t53 to t55 ((B) of FIG. 15).

Next, the display driving section 20S carries out a first-time line sequential scanning by performing display driving based on the black image Bk on the odd-numbered lines of the liquid crystal display section 13 and by performing display driving based on the right-eye image FR on the even-numbered lines during a timing period of t54 to t57, and carries out a second-time line sequential scanning similarly during a timing period of t57 to t59 ((A) of FIG. 15 and FIG. 16). At a timing t56, the left-eye shutter 8L transits from the open state to the closed state, while the right-eye shutter 8R transits from the closed state to the open state ((C) and (D) of FIG. 15). The backlight 15R turns on state during a timing period of t58 to t60 ((B) of FIG. 15).

FIG. 17A and FIG. 17B illustrate operation of the sub-pixel SPix according to the comparative example 2, wherein FIG. 17A shows the luminance I in the sub-pixel SPix belonging to a certain odd-numbered line, and FIG. 17B shows the luminance I in the sub-pixel SPix belonging to an even-numbered line next to the odd-numbered line.

As shown in FIG. 17A, the sub-pixel SPix belonging to the odd-numbered line performs a display based on the left-eye image FL during each of periods P1R and P2R, and performs a display based on the black image Bk during each of periods P3R and P4R. Further, as shown in FIG. 17B, the sub-pixel SPix belonging to the even-numbered line performs a display based on the black image Bk during each of periods P1R and P2R, and performs a display based on the right-eye image FR during each of periods P3R and P4R.

In the display system 1S according to the comparative example 2, display driving based on the left-eye image FL for the odd-numbered lines and display driving based on the black image Bk for the even-numbered lines are carried out at the same time during each of the periods P1R and P2R, and display driving based on the black image Bk for the odd-numbered lines and display driving based on the right-eye image FR for the even-numbered lines are carried out at the same time during each of the periods P3R and P4R. As a result, it is likely that a crosstalk would occur in which the left-eye image FL and the right-eye image FR get mixed.

In concrete terms, as shown in FIG. 17B, for example, even though the display driving section 20S writes the pixel voltage Vpix representing the black image into the sub-pixel SPix related to the even-numbered line during the period P1R, there is a possibility that the luminance I would not reach "0" because the capacitance Clc varies depending on the orientation of the liquid crystal molecules M, as previously described (waveform W2). This will possibly bring about a crosstalk in which the left-eye image FL (FIG. 17A) that is displayed by the odd-numbered lines and a residual image of the right-eye image FR (waveform W2 in FIG. 17B) during the last period P4R that is displayed by the even-numbered lines get mixed, resulting in the image quality being deteriorated. Similarly, as shown in FIG. 17A, even though the display driving section 20S writes the pixel voltage Vpix representing the black image into the sub-pixel SPix related to the odd-numbered line during the period P3R, there is a possibility that the luminance I would not reach "0" because the capacitance Clc varies depending on the orientation of the liquid crystal molecules M, as previously described (waveform W3). This will possibly bring about a crosstalk in which the right-eye image FR (FIG. 17B) that is displayed by the even-numbered lines and a residual image of the left-eye image FL (waveform W3 in FIG. 17A) during the last period P2R that is displayed by the odd-numbered lines get mixed, resulting in the image quality being deteriorated.

On the other hand, in the display system 1 according to the first embodiment, a sequential scanning based on the right-eye image FR is performed on the even-numbered lines during each of periods P5 and P6 after a sequential scanning based on the black image Bk is performed on the odd-numbered lines during each of periods P3 and P4, and a sequential scanning based on the left-eye image FL is performed on the odd-numbered lines during each of periods P1 and P2 after a sequential scanning based on the black image Bk is performed on the even-numbered lines during each of periods P7 and P8. This ensures that display driving based on different images are not performed simultaneously on the even-numbered lines and the odd-numbered lines, which allows any possibility of occurrence of a crosstalk to be reduced, resulting in the image quality being enhanced.

Further, in the display system 1S according to the comparative example 2, because a black color is displayed during only two periods of the periods P1R to P4R, in case of slow response of the liquid crystal molecules M, there is a possibility that the luminance I will not drop fully. In such a case, it is likely that the image quality will deteriorate due to a crosstalk and the like.

On the contrary, in the display system 1 according to the first embodiment, because a black color is displayed during six periods of the periods P1 to P8, even in case of slow response of the liquid crystal molecules M, it is possible to drop the luminance I down to a lower value. This allows any possibility of occurrence of a crosstalk to be reduced, resulting in deterioration of the image quality being prevented.

[Effects]

As described above, in the first embodiment, the same pixel voltage is written into the sub-pixel twice successively, which allows the desired luminance to be achieved, resulting in the image quality being enhanced.

Further, in the first embodiment, a sequential scanning is carried out for only the odd-numbered lines or only the even-numbered lines, and thus it is possible to reduce by half the number of the lines to be scanned, which assures a time for a second-time sequential scanning.

Additionally, in the first embodiment, the line for displaying the left-eye image and the line for displaying the right-eye image are different from each other, and thus it is possible to reduce any possibility of occurrence of a crosstalk, which allows to the image quality to be enhanced.

Moreover, in the first embodiment, a display scanning based on the right-eye image is performed on the even-numbered lines after a sequential scanning based on the black image is performed on the odd-numbered lines, and a display scanning based on the left-eye image is performed on the odd-numbered lines after a sequential scanning based on the black image is performed on the even-numbered lines. This makes it possible to reduce any possibility of occurrence of a crosstalk, which allows to the image quality to be enhanced.

Further, in the first embodiment, a longer period for displaying a black color is assured, and thus it is possible to reduce any possibility of occurrence of a crosstalk, which allows to the image quality to be enhanced.

MODIFICATION EXAMPLE 1-1

In the above-described first embodiment, a sequential scanning based on the black image Bk is performed only on the odd-numbered lines during each of the periods P3 and P4, and a sequential scanning based on the black image Bk is performed only on the even-numbered lines during each of the periods P7 and P8. However, a sequential scanning is not limited thereto, and instead as shown in FIG. 18, for example, a sequential scanning based on the black image Bk may be performed in units of two adjacent lines (odd-numbered line and even-numbered line) during the periods P3 and P4 as well as the periods P7 and P8. In this case as well, because driving is performed for every two lines, it is possible to reduce a scan timing cycle T1, thereby allowing to assure the time for a second-time sequential scanning.

MODIFICATION EXAMPLE 1-2

Further, in the above-described first embodiment, a sequential scanning is carried out twice for each of the following images in the order of the left-eye image FL, the black image Bk, the right-eye image FR, and the black image Bk. However, a sequential scanning is not limited thereto, and instead as shown in FIG. 19 and FIG. 20, for example, a sequential scanning may be performed once for the black image Bk after a sequential scanning is performed three times for the left-eye image FL, and a sequential scanning may be performed once for the black image Bk after a sequential scanning is performed three times for the right-eye image FR. In this case, as shown in FIG. 19, it is possible to extend a turn-on period of the backlight 15, which allows the luminance to be increased. Further, as shown in FIG. 21 and FIG. 22, for example, a sequential scanning may be performed three times for the black image Bk after a sequential scanning is performed once for the left-eye image FL, and a sequential scanning may be performed three times for the black image Bk after a sequential scanning is performed once for the right-eye image FR. In this case, it is possible to drop the luminance I down to a lower value in displaying the black image Bk, which allows to reduce any possibility of occurrence of a crosstalk.

MODIFICATION EXAMPLE 1-3

Additionally, in the above-described first embodiment, although a sequential scanning is performed eight times during a timing cycle T0, a sequential scanning is not limited thereto, and alternatively, the scanning may be partially omitted.

As shown in FIG. 23 and FIG. 24, for example, a second-time sequential scanning for the black image Bk may be omitted. In this case, for example, a first-time sequential scanning for the black image Bk is performed during a timing period of t3 to t6, but a sequential scanning is not performed during a timing period of t6 to t7, and each line operates to keep its previous state.

Moreover, as shown in FIG. 25 and FIG. 26, for example, a second-time sequential scanning for the left-eye image FL and the right-eye image FR may be omitted. In this case, for example, a first-time sequential scanning for the left-eye image FL is performed during a timing period of t0 to t1, but a sequential scanning is not performed during a timing period of t1 to t3, and each line operates to keep its previous state.

Moreover, as shown in FIG. 27 and FIG. 28, for example, in the case of FIG. 19 and FIG. 20 in the modification example 1-2, a second-time and a third-time sequential scanning for the left-eye image FL and the right-eye image FR may be omitted. Alternatively, as shown in FIG. 29 and FIG. 30, for example, in the case of FIG. 21 and FIG. 22 in the modification example 1-2, a second-time and a third-time sequential scanning for the black image Bk may be omitted.

MODIFICATION EXAMPLE 1-4

In the above-described first embodiment, although the same pixel voltage Vpix is written to the sub-pixel twice successively, the operation is not limited thereto, and instead for example, different pixel voltage Vpix may be written by performing a so-called overdrive processing in a first-time writing operation.

(2. Second Embodiment)

Next, the description is provided on a display system 2 according to a second embodiment of the present disclosure. In the second embodiment, a connection between the sub-pixel SPix and the gate line GCL in the liquid crystal display section is different from that in the above-described first embodiment. It is to be noted that any component parts essentially same as those of the display system 1 according to the above-described first embodiment are denoted with the same reference numerals, and the related description is omitted as appropriate.

FIG. 31 shows a configuration example of a liquid crystal display section 33 related to the display system 2 according to the second embodiment. The liquid crystal display section 33 is configured in such a manner that each of the sub-pixels SPix which are adjacent in a horizontal direction X is connected with the different gate line GCL. More specifically, a certain sub-pixel SPix is connected with a certain gate line GCL, and a sub-pixel SPix that is disposed next to the certain sub-pixel SPix in a horizontal direction X is connected with a gate line GCL next to the certain gate line GCL.

In other words, in the liquid crystal display section 33, one of three sub-pixels SPix belonging to each pixel Pix is disposed at a position different from any of positions of other two sub-pixels SPix in a vertical direction Y. More specifically, as shown in FIG. 31, for example, a sub-pixel SPix of red color (R) and a sub-pixel SPix of blue color (B) of three sub-pixels SPix belonging to the pixel Pix that is connected with a certain gate line GCL are disposed on the opposite side of a sub-pixel SPix of green color (G) with the gate line GCL interposed between.

With this configuration, the left-eye image FL is displayed by the sub-pixels SPix that are disposed at both sides with a gate line GCL in the odd-numbered line (for example, the (2k−1)th line) interposed between. Further, the right-eye image FR is displayed by the sub-pixels SPix that are disposed at both sides with a gate line GCL in the even-numbered line (for example, the 2k-th line) interposed between. In such a manner, in the liquid crystal display section 33, the sub-pixels SPix for displaying each image are disposed more uniformly as compared with the liquid crystal display section 13 (FIG. 3) according to the above-described first embodiment, which allows the image quality to be enhanced.

As described above, in the second embodiment, each of the sub-pixels SPix that are adjacent in the horizontal direction is configured to be connected with a different gate line, which allows the image quality to be enhanced. Any other effects are same as those in the case of the above-described first embodiment.

MODIFICATION EXAMPLE 2-1

In the above-described second embodiment, a different gate line GCL is connected for each of the sub-pixels SPix that are adjacent in the horizontal direction, although the connection is not limited thereto, and a different gate line GCL may be connected for each of a predetermined number of the sub-pixels SPix. An example of a case where a different gate line GCL is connected for every two sub-pixels SPix is shown in FIG. 32, an example of a case where a different gate line GCL is connected for every three sub-pixels SPix (that is, pixel Pix) is shown in FIG. 33, and an example of a case where a different gate line GCL is connected for every six sub-pixels SPix is shown in FIG. 34.

MODIFICATION EXAMPLE 2-2

In the above-described second embodiment, although the liquid crystal display section 33 is applied to the display system 1 according to the above-described first embodiment, the application is not limited thereto, and for example, the liquid crystal display section 33 may be applied to the display system according to any of the modification examples 1-1 to 1-4 of the above-described first embodiment.

(3. Third Embodiment)

Next, the description is provided on a display system 3 according to a third embodiment of the present disclosure. In the third embodiment, the display system 1 according to the above-described first embodiment is applied to a multi-viewing system that allows a plurality of viewers to view different images at the same time. It is to be noted that any component parts essentially same as those of the display system 1 according to the above-described first embodiment are denoted with the same reference numerals, and the related description is omitted as appropriate. Hereinafter, the description is provided by taking as an example a multi-viewing system in which two viewers 9A and 9B view images.

FIG. 35 shows a configuration example of the display system 3 according to the third embodiment. The display system 3 includes a display unit 40 and two pairs of shutter glasses 80A and 80B. Based on an image signal Sdisp, the display unit 40 displays an image FA to be viewed by the viewer 9A and an image FB to be viewed by the viewer 9B. In this case, the image signal Sdisp includes image information of the image FA and the image FB. The shutter glasses 80A and 80B are put on by the viewers 9A and 9B, respectively.

The display unit 40 has a shutter control section 46. The shutter control section 46 generates two shutter control signals CTLA and CTLB, and provides the shutter control signal CTLA to the shutter glasses 80A, while providing the shutter control signal CTLB to the shutter glasses 80B. A left-eye shutter 8AL and a right-eye shutter 8AR of the shutter glasses 80A perform an opening/closing action based on the shutter control signal CTLA. At this time, the left-eye shutter 8AL and the right-eye shutter 8AR perform an opening/closing action simultaneously. Similarly, a left-eye shutter 8BL and a right-eye shutter 8BR of the shutter glasses 80B perform an opening/closing action based on the shutter control signal CTLB. At this time, the left-eye shutter 8BL and the right-eye shutter 8BR perform an opening/closing action simultaneously.

FIG. 36A and FIG. 36B schematically show overall operation of the display system 3. FIG. 36A shows operation in displaying the image FA for the viewer 9A, and FIG. 36B shows operation in displaying the image FB for the viewer 9B. When the display unit 40 displays the image FA, as shown in FIG. 36A, each of the left-eye shutter 8AL and the right-eye shutter 8AR of the shutter glasses 80A is put in an open state, while each of the left-eye shutter 8BL and the right-eye shutter 8BR of the shutter glasses 80B is put in a closed state. On this occasion, the viewer 9A views the image FA. On the other hand, when the display unit 40 displays the image FB, as shown in FIG. 36B, each of the left-eye shutter 8AL and the right-eye shutter 8AR of the shutter glasses 80A is put in a closed state, while each of the left-eye shutter 8BL and the right-eye shutter 8BR of the shutter glasses 80B is put in an open state. On this occasion, the viewer 9B views the image FB. These operations are repeated alternately, thereby allowing the viewer 9A to view a picture composed of the image FA, and allowing the viewer 9B to view a picture composed of the image FB. This makes it possible to achieve a multi-viewing system that allows a plurality of viewers to view each of a plurality of images to be displayed on a single display unit.

FIG. 37 shows a timing waveform chart for a display operation of the display system 3, wherein (A), (B), (C), and (D) show operation of the liquid crystal display section 13, operation of the backlight 15, operation of the shutter glasses 80A, and operation of the shutter glasses 80B, respectively. In (A) of FIG. 37, for example, "FA" indicates that the display driving section 20 performs a display driving based on the image FA, and "FB" indicates that the display driving section 20 performs a display driving based on the image FB.

FIG. 38 shows operation of the odd-numbered lines and the even-numbered lines of the liquid crystal display section 13 during the periods P1 to P8. In FIG. 38, "FA" indicates that the display driving section 20 performs a display driving based on the image FA, and "FB" indicates that the display driving section 20 performs a display driving based on the image FB.

First, the display driving section 20 performs a first-time line sequential scanning based on the image FA only on the odd-numbered lines of the liquid crystal display section 13 during a timing period of t80 to t81, and performs a second-time line sequential scanning similarly during the following timing period of t81 to t83 ((A) of FIG. 37 and FIG. 38). During this period, no display driving is performed on the even-numbered lines of the liquid crystal display section 13, and such a state is held. During this period, each of the left-eye shutter 8AL and the right-eye shutter 8AR of the shutter glasses 80A is put in an open state, while each of the left-eye shutter 8BL and the right-eye shutter 8BR of the shutter glasses 80B is put in a closed state ((C) and (D) of FIG. 37). The backlight 15 turns on during a timing period of t82 to t84 ((B) of FIG. 37). This allows the viewer 9A to view the image FA during the timing period of t82 to t84.

Next, the display driving section 20 performs a first-time sequential scanning based on the black image Bk only on the odd-numbered lines of the liquid crystal display section 13 during a timing period of t83 to t86, and performs a second-time sequential scanning similarly during the following timing period of t86 to t87 ((A) of FIG. 37 and FIG. 38). This makes it possible to fully reset the sub-pixel SPix in the odd-numbered lines. During this period, no display driving is performed on the even-numbered lines of the liquid crystal display section 13, and such a state is held. Subsequently, at a timing t85, each of the left-eye shutter 8AL and the right-eye shutter 8AR of the shutter glasses 80A transits from an open state to a closed state, while each of the left-eye shutter 8BL and the right-eye shutter 8BR of the shutter glasses 80B transits from a closed state to an open state ((C) and (D) of FIG. 37).

Subsequently, the display driving section 20 performs a first-time sequential scanning based on the image FR only on the even-numbered lines of the liquid crystal display section 13 during a timing period of t87 to t88, and performs a second-time sequential scanning similarly during the following timing period of t88 to t91 ((A) of FIG. 37 and FIG. 38). During this period, no display driving is performed on the odd-numbered lines of the liquid crystal display section 13, and a state for displaying a black color is held. The backlight 15 turns on during a timing period of t89 to t91 ((B) of FIG. 37). This allows the viewer 9B to view the image FB during the timing period of t89 to t91.

Thereafter, the display driving section 20 performs a first-time sequential scanning based on the black image Bk only on the even-numbered lines of the liquid crystal display section 13 during a timing period of t90 to t93, and performs a second-time sequential scanning based on the black image Bk similarly during the following timing period of t93 to t94 ((A) of FIG. 37 and FIG. 38). This makes it possible to fully reset the sub-pixel SPix in the even-numbered lines. During this period, no display driving is performed on the odd-numbered lines of the liquid crystal display section 13, and a state for displaying a black color is held. Subsequently, at a timing t92, each of the left-eye shutter 8AL and the right-eye shutter 8AR of the shutter glasses 80A transits from the closed state to the open state, while each of the left-eye shutter 8BL and the right-eye shutter 8BR of the shutter glasses 80B transits from the open state to the closed state ((C) and (D) of FIG. 37).

As described above, in the third embodiment, the plurality of pairs of shutter glasses are provided, and the images FA and FB are displayed, and further the left-eye shutter and the right-eye shutter of each pair of the shutter glasses perform an opening/closing action at the same time, which makes it possible to achieve a multi-viewing system. Any other effects are same as those in the case of the above-described first embodiment and the like.

MODIFICATION EXAMPLE 3-1

In the above-described third embodiment, although the display system 1 is applied to a multi-viewing system, the application is not limited thereto, and instead for example, the display system 2 may be applied to the multi-viewing system.

(4. Application Examples)

Next, the description is provided on application examples of any of the display systems that are described in the above-described embodiments and the modification examples.

FIG. 39 shows an external appearance of a television receiver to which any of the display systems according to the above-described embodiments and the modification examples is applied. The television receiver may have, for example, an image display screen section 510 including a front panel 511 and a filter glass 512. The television receiver is configured to include any of the display units on the display systems according to the above-described embodiments and the modification examples.

In addition to such a television receiver, the display systems according to the above-described embodiments and the modification examples are applicable to a notebook personal computer and the like. In other words, the display systems according to the above-described embodiments and the modification examples are applicable to electronic apparatuses in every field that display images.

The present technology is described thus far with reference to some embodiments and the modification examples, as well as the application examples for electronic apparatuses. However, the present technology is not limited to the embodiments and the like, and different variations are available.

For example, in each of the above-described embodiments, although the present technology is applied to a liquid crystal display unit, the application is not limited thereto, and instead for example, the present technology may be applied to an EL (Electro Luminescence) display unit utilizing organic EL.

Further, for example, in each of the above-described embodiments, although a quad-speed display panel is used as the liquid crystal display section 13, such a display panel is not limited thereto, and instead for example, an octuple-speed display panel may be used. In this case, in the above-described first embodiment, for example, a sequential scanning may be performed four times for each of the following images in the order of the left-eye image FL, the black image Bk, the right-eye image FR, and the black image Bk.

It is to be noted that the technology may be configured as follows.

(1) A display unit, including:
a display section having a plurality of pixels in a first group and a plurality of pixels in a second group, and performing a display operation by switching a display based on a first type of frame image during a first period and a display based on a second type of frame image during a second period; and
a driving section performing a first driving to drive the plurality of pixels in the first group without driving the plurality of pixels in the second group during the first period, and performing a second driving to drive the plurality of pixels in the second group without driving the plurality of pixels in the first group during the second period.

(2) The display unit according to (1), wherein the plurality of pixels in the first group are a plurality of odd-numbered line pixels, and
the plurality of pixels in the second group are a plurality of even-numbered line pixels.

(3) The display unit according to (2), wherein the first driving scans the plurality of odd-numbered line pixels one or more times, and
the second driving scans the plurality of even-numbered line pixels one or more times.

(4) The display unit according to (2) or (3), wherein the driving section performs a third driving to write predetermined luminance information to the plurality of odd-numbered line pixels after the first driving and before the second driving, and
performs a fourth driving to write the predetermined luminance information to the plurality of even-numbered line pixels after the second driving and before the first driving.

(5) The display unit according to (4), wherein the predetermined luminance information indicates a black color.

(6) The display unit according to (4) or (5), wherein the third driving scans the plurality of odd-numbered line pixels one or more times, and
the fourth driving scans the plurality of even-numbered line pixels one or more times.

(7) The display unit according to (2) or (3), wherein the driving section performs a third driving to write predetermined luminance information to each pixel in the display section after the first driving and before the second driving, and
performs a fourth driving to write the predetermined luminance information to each pixel in the display section after the second driving and before the first driving.

(8) The display unit according to (7), wherein the third driving and the fourth driving perform scan driving in units of two lines that are adjacent to each other.

(9) The display unit according to any one of (2) to (8), wherein the display section includes a plurality of scan signal lines,
the plurality of odd-numbered line pixels are connected with odd-numbered scan signal lines among the plurality of scan signal lines, and
the plurality of even-numbered line pixels are connected with even-numbered scan signal lines among the plurality of scan signal lines.

(10) The display unit according to (9), wherein pixels connected with a scan signal line are arranged side by side in a direction intersecting with a scan direction.

(11) The display unit according to (9), wherein one pixel is arranged at a position different in a scan direction from a position of one of other pixels connected with the same scan signal line as the scan signal line of the one pixel.

(12) The display unit according to any one of (1) to (11), further including a backlight that turns on in synchronization with a display based on the first type of frame image and a display based on the second type of frame image,
wherein the display section is a liquid crystal display section.

(13) The display unit according to any one of (1) to (12), further including a shutter control section that takes control to switch opening/closing action of a left-eye shutter and a right-eye shutter in each of one or more pairs of shutter glasses in synchronization with a display in the display section.

(14) The display unit according to (13), wherein the shutter control section puts the left-eye shutter in an open state and puts the right-eye shutter in a closed state in synchronization with one of the first driving and the second driving, and
puts the left-eye shutter in a closed state and puts the right-eye shutter in an open state in synchronization with the other of the first driving and the second driving.

(15) The display unit according to (13), wherein the shutter control section puts each of the left-eye shutter and the right-eye shutter in first shutter glasses of the one or more pairs of shutter glasses in an open state in synchronization with one of the first driving and the second driving, and
puts each of the left-eye shutter and the right-eye shutter in the first shutter glasses in a closed state in synchronization with the other of the first driving and the second driving.

(16) A display driving circuit, including:
a driving section performing a first driving to drive a plurality of pixels in a first group without driving a plurality of pixels in a second group during a first period, and performing a second driving to drive the plurality of pixels in the second group without driving the plurality of pixels in the first group during a second period for a display section having the plurality of pixels in the first group and the plurality of pixels in the second group, the display section performing a display operation by switching a display based on a first type of frame image during the first period and a display based on a second type of frame image during the second period.

(17) A display driving method, including:
preparing a first type of frame image and a second type of frame image; and
performing a display operation by switching a display based on the first type of frame image during a first period and a display based on the second type of frame image during a second period by performing a first driving to drive a plurality of pixels in a first group without driving a plurality of pixels in a second group during the first period and by performing a second driving to drive the plurality of pixels in the second group without driving the plurality of pixels in the first group during the second period.

The present disclosure contains subject matter related to that disclosed in Japanese Priority Patent Application JP 2012-164333 filed in the Japan Patent Office on Jul. 25, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A display unit, comprising:
a display section having a plurality of pixels in a first group and a plurality of pixels in a second group, and configured to perform a display operation by switching a display of the first group, displaying a first type of frame image during a first period, to a display of the second group, displaying a second type of frame image during a second period; and
a driving section configured to perform a first driving to drive the plurality of pixels in the first group without driving the plurality of pixels in the second group during the first period, and performing a second driving to drive the plurality of pixels in the second group without driving the plurality of pixels in the first group during the second period, wherein the first driving sequentially scans each of the plurality of pixels in the first group a plurality of times during the first period,
wherein the first driving is performed two times for consecutive time periods before a third driving which writes predetermined luminance information to the plurality of pixels in the first group after the first driving and before the second driving.

2. The display unit according to claim 1, wherein the plurality of pixels in the first group are a plurality of odd-numbered line pixels, and the plurality of pixels in the second group are a plurality of even-numbered line pixels.

3. The display unit according to claim 2, wherein the second driving scans the plurality of even-numbered line pixels a plurality of times during the second period.

4. The display unit according to claim 2, wherein the driving section is configured to perform the third driving to write predetermined luminance information to the plurality of odd-numbered line pixels after the first driving and before the second driving, and perform a fourth driving to write the predetermined luminance information to the plurality of even-numbered line pixels after the second driving and before the first driving.

5. The display unit according to claim 4, wherein the predetermined luminance information indicates a black color.

6. The display unit according to claim 4, wherein the third driving scans the plurality of odd-numbered line pixels one or more times, and the fourth driving scans the plurality of even-numbered line pixels one or more times.

7. The display unit according to claim 1, wherein the driving section is configured to perform the third driving to write predetermined luminance information to each pixel in the display section, after the first driving and before the second driving, and perform a fourth driving to write the predetermined luminance information to each pixel in the display section, after the second driving and before the first driving.

8. The display unit according to claim 7, wherein the third driving and the fourth driving perform scan driving in units of two lines that are adjacent to each other.

9. The display unit according to claim 2, wherein the display section includes a plurality of scan signal lines, the plurality of odd-numbered line pixels are connected with odd-numbered scan signal lines among the plurality of scan signal lines, and the plurality of even-numbered line pixels are connected with even-numbered scan signal lines among the plurality of scan signal lines.

10. The display unit according to claim 9, wherein pixels connected with a scan signal line are arranged side by side in a direction intersecting with a scan direction.

11. The display unit according to claim 9, wherein one pixel is arranged at a position different in a scan direction from a position of one of other pixels connected with the same scan signal line as the scan signal line of the one pixel.

12. The display unit according to claim 1, further comprising a backlight configured to turn on in synchronization with the display of the first group, displaying the first type of frame image and the display of the second group, displaying the second type of frame image, wherein the display section is a liquid crystal display section.

13. The display unit according to claim 1, further comprising a shutter control section configured to control an opening/closing action of a left-eye shutter and a right-eye shutter in each of one or more pairs of shutter glasses in synchronization with the display in the display section.

14. The display unit according to claim 13, wherein the shutter control section is configured to put the left-eye shutter in an open state and put the right-eye shutter in a closed state in synchronization with one of the first driving and the second driving, and put the left-eye shutter in a closed state and put the right-eye shutter in an open state in synchronization with the other of the first driving and the second driving.

15. The display unit according to claim 13, wherein the shutter control section is configured to put each of the left-eye shutter and the right-eye shutter in first shutter glasses of the one or more pairs of shutter glasses in an open state in synchronization with one of the first driving and the second driving, and put each of the left-eye shutter and the right-eye shutter in the first shutter glasses in a closed state in synchronization with the other of the first driving and the second driving.

16. A display driving circuit, comprising:
a driving section configured to:
perform a first driving to drive a plurality of pixels in a first group without driving a plurality of pixels in a second group during a first period; and
perform a second driving to drive the plurality of pixels in the second group without driving the plurality of pixels in the first group during a second period for a display section having the plurality of pixels in the first group and the plurality of pixels in the second group, wherein the first driving sequentially scans each of the plurality of pixels in the first group a plurality of times during the first period,
wherein the display section is configured to perform a display operation by switching a display of the first group, displaying a first type of frame image during the first period, to a display of the second group, displaying a second type of frame image during the second period, and
wherein the first driving is performed two times for consecutive time periods before a third driving which writes predetermined luminance information to the plurality of pixels in the first group after the first driving and before the second driving.

17. A display driving method, comprising:
preparing a first type of frame image and a second type of frame image;
performing a display operation by switching a display of a plurality of pixels in a first group, displaying the first type of frame image during a first period, to a display of a plurality of pixels in a second group; and
displaying the second type of frame image during a second period, by performing a first driving to drive the plurality of pixels in the first group without driving the plurality of pixels in the second group during the first period and by performing a second driving to drive the plurality of pixels in the second group without driving the plurality of pixels in the first group during the second period,
wherein the first driving sequentially scans each of the plurality of pixels in the first group a plurality of times during the first period, and
wherein the first driving is performed two times for consecutive time periods before a third driving which writes predetermined luminance information to the plurality of pixels in the first group after the first driving and before the second driving.

18. The display unit according to claim 1, further comprising a backlight configured to emit light to the display section.

19. The display unit according to claim 18, wherein the backlight is divided into a plurality of parts, wherein each of the plurality of parts is configured to emit the light independently.

20. A display unit, comprising:
a display section having a plurality of pixels in a first group and a plurality of pixels in a second group, and configured to perform a display operation by switching a display of the first group, displaying a first type of frame image during a first period, to a display of the second group, displaying a second type of frame image during a second period; and
a driving section configured to perform a first driving to drive the plurality of pixels in the first group without driving the plurality of pixels in the second group during the first period, and performing a second driving to drive the plurality of pixels in the second group without driving the plurality of pixels in the first group during the second period, wherein the first driving sequentially scans each of the plurality of pixels in the first group a plurality of times during the first period,
wherein the second driving is performed two times for consecutive time periods before a fourth driving which writes predetermined luminance information to the second plurality of pixels in the second group after the second driving and before the first driving.

* * * * *